United States Patent

[11] 3,624,517

[72] Inventors Kengo Kobayashi Kawasaki-shi; Mitsuo Manabe, Tokyo, both of Japan

[21] Appl. No. 851,316

[22] Filed Aug. 19, 1969

[45] Patented Nov. 30, 1971

[73] Assignee Fujitsu Limited Kawasaki, Japan

[32] Priority Aug. 21, 1968

[33] Japan

[31] 43/59747

[54] CIRCUIT ARRANGEMENT FOR MAKING SPACES IN A PULSE TRAIN MORE NEARLY UNIFORM

16 Claims, 18 Drawing Figs.

[52] U.S. Cl. .......... 328/61, 328/37, 328/44, 328/48, 328/63

[51] Int. Cl. .......... H03k 3/72

[50] Field of Search .......... 307/271, 295; 328/37, 48, 61, 63

[56] References Cited

UNITED STATES PATENTS

| | | | |
|---|---|---|---|
| 3,293,561 | 12/1966 | Hegarty et al. | 307/295 X |
| 3,327,228 | 6/1967 | Deavenport et al. | 307/295 X |
| 3,393,366 | 7/1968 | Shoop | 328/48 |
| 3,411,094 | 11/1968 | Martinek | 328/37 |
| 3,517,323 | 6/1970 | Rudin | 307/295 X |

*Primary Examiner*—John S. Heyman

*Attorneys*—Curt M. Avery, Arthur E. Wilfond, Herbert L. Lerner and Daniel J. Tick

ABSTRACT: A digital to pulse frequency converter converts command pulses accumulated in a memory to a pulse train having a frequency directly proportional to the accumulated value in the memory. The frequency converter has a plurality of inputs connected to corresponding outputs of the memory and an output connected in negative feedback arrangement to an input of the frequency converter thereby feeding back the output of the frequency converter negatively and in a digital manner to the memory and providing an output pulse train free of abrupt frequency change. Fixed frequency pulse trains are supplied to each of the memory and the frequency converter.

CIRCUIT ARRANGEMENT FOR MAKING SPACES IN A PULSE TRAIN MORE NEARLY UNIFORM

DESCRIPTION OF THE INVENTION

The present invention relates to a circuit arrangement for making the spaces in a pulse train more nearly uniform. More particularly, the invention relates to a circuit arrangement for converting uneven spaces in a pulse train to more even spaces. The converter circuit of the present invention may be utilized in digital control devices for various industrial apparatus such as machine tools, cutting torch, drawing instruments, etc.

In a digital control of this type of apparatus, an electronic computer or numerical control comprises a pulse distributor for issuing command pulses to a servosystem such as an electric pulse motor or electrohydraulic pulse motor.

A servosystem, such as an electric pulse motor, occasionally operates erroneously when the command pulse train applied to it is an intermittent, instantaneous pulse train. In order to prevent erroneous operation or response failure, the frequency of the command pulse must be reduced. Consequently, the pulse response frequency is also disadvantageously reduced.

An improvement has been proposed for overcoming this defect, which comprises a pulse train space converter circuit between the pulse distributor and an electric pulse motor. The command pulse train is supplied to the motor through the smoothing circuit. The converter circuit consists of a reversible counter, a digital to analog converter, and a variable frequency oscillator. The command pulses are accumulated at the reversible counter, and the value at the counter is converted to a voltage by the digital to analog converter. Furthermore, pulses of the frequency directly proportional to the voltage are provided by the variable frequency oscillator. The pulses from the oscillator are applied to the servosystem as output pulses of the converter circuit and are simultaneously negatively fed back to the reversible counter.

Since a digital to analog converter and variable frequency oscillator are thus utilized in the known converter circuit, a precise proportionality cannot be attained between the value measured at the reversible counter and the frequency of the converter circuit output pulse corresponding thereto. The known converter circuit, therefore, is inadequate for controlling continuous cutting by a machine tool, or contour drawing by a drawing machine. This is due to the inadequacy of precision of the digital to analog converter and variable frequency oscillator for such purposes.

The principal object of the present invention is to provide a new and improved circuit arrangement for making the spaces in a pulse train more nearly uniform.

An object of the present invention is to provide a circuit arrangement which makes the spaces in a pulse train more nearly uniform with great precision.

An object of the present invention is to provide a circuit arrangement which functions to make the spaces in a pulse train more nearly uniform with efficiency, effectiveness and reliability.

An object of the present invention is to provide a circuit arrangement of simple structure which functions to make the spaces in a pulse train more nearly uniform with great precision.

In accordance with the present invention, the space converter utilizes a digital converter instead of a digital to analog converter and variable frequency oscillator.

The pulse train space converter circuit of the present invention to be inserted between a pulse distributor and a servomotor, such as an electric pulse motor, comprises a register, or a memory device, for storing the command pulses from the pulse distributor. A digital to pulse frequency converter receives the stored value in the register periodically and converts it to a pulse train proportional to the stored value. A circuit effects negative feedback of the output of the digital to pulse frequency converter to the register.

Since the stored value in the register is thus digitally converted, error is substantially negligible. Also the register utilized in the space converter of the present invention may comprise inexpensive and economical elements such as an integrated circuit memory device, core memory, delay line, flip-flops, etc. It is likewise possible to process several inputs with a single circuit by a time-division system.

In accordance with the present invention, a pulse train space converter for making the spaces in an input pulse train more nearly uniform comprises an input for providing an input command pulse train. A memory connected to the input accumulates command pulses as digital values. A digital to pulse frequency converter having an input connected to the memory and having a plurality of outputs and another input converts command pulses accumulated in the memory to a pulse train having a frequency directly proportional to the accumulated value in the memory. The frequency converter has a plurality of inputs connected to corresponding outputs of the memory and an output connected in negative feedback arrangement to an input of the frequency converter thereby feeding back the output of the frequency converter negatively and in a digital manner to the memory and providing an output pulse train free of abrupt frequency change. Fixed frequency pulse means supplies fixed frequency pulse trains to each of the memory and the frequency converter. An output connected to the output of the frequency converter provides the output pulse train.

The memory comprises a reversible counter. The fixed frequency pulse means comprises a timing pulse oscillator having an output and a frequency divider having an input connected to the oscillator and an output connected to the memory and the frequency converter.

The input command pulse train comprises positive and negative pulses and the output comprises a positive polarity output terminal and a negative polarity output terminal. A sign discriminator connected between the input and the memory determines whether each output pulse of the frequency converter is transferred to the corresponding output terminal. A mixer connected between the input and the sign discriminator prevents overlap of the fed back output and the command pulses.

In accordance with our invention, a pulse train space converter for making the spaces in an input pulse train more nearly uniform comprises an input for providing an input command pulse train. Clock means provides a clock pulse train. A digital to pulse frequency converter has inputs coupled to the input and the clock means and an output. The frequency converter accumulates command pulses as digital values and converts command pulses accumulated in the frequency converter to a pulse train having a frequency directly proportional to the accumulated value. The output of the frequency converter is connected in negative feedback arrangement to an input thereof thereby feeding back the output of the frequency converter means negatively and in a digital manner and providing an output pulse train free of abrupt frequency change. An output connected to the output of the frequency converter provides the output pulse train. A mixer connected between the input and the frequency converter prevents overlap of the fed back output and the command pulses.

The frequency converter comprises a memory having a plurality of outputs and an input connected to the mixer for accumulating command pulses as digital values. A counter is coupled to the clock means and has a plurality of outputs for counting pulses. A digital proportional converter has an output, a first group of inputs connected to the outputs of the counter and a second group of inputs connected to the outputs of the memory. A differentiator is connected between an oscillator and the clock means and the counter of the frequency converter for precisely synchronizing the clock pulses provided by the clock means. A frequency divider is connected between the clock means and the output of the digital proportional converter of the frequency converter and the output and corrects disturbances in the intervals of the output pulses of the frequency converter.

In accordance with the present invention, a pulse train space converter for making the spaces in an input pulse train more nearly uniform comprises an input for providing an input command pulse train comprising positive and negative pulses. A digital to pulse frequency converter has inputs coupled to the input and an output and accumulates command pulses as digital values and converts command pulses accumulated in the frequency converter to a pulse train having a frequency directly proportional to the accumulated value. The output of the frequency converter is connected in negative feedback arrangement to an input thereof, thereby feeding back the output of the frequency converter negatively and in a digital manner and providing an output pulse train free of abrupt frequency change. An output connected to the output of the frequency converting means provides the output pulse train. The output comprises a positive polarity output terminal and a negative polarity output terminal. A sign discriminator connected between the input and the frequency converter determines whether each output pulse of the frequency converter is transferred to the corresponding output terminal. A mixer is connected between the input and the sign discriminator and prevents overlap of the fed back output and the command pulses.

The frequency converter comprises a memory having a plurality of outputs and inputs connected to the sign discriminator and accumulates command pulses as digital values. A counter has a plurality of outputs and counts pulses. A digital proportional converter has an output, a first group of inputs connected to the outputs of the counter and a second group of inputs connected to the outputs of the memory. A differentiator is connected between an oscillator and the counter of the frequency converter. A frequency divider is connected between the output of the digital proportional converter of the frequency converter and the output for correcting disturbances in the intervals of the output pulses of the frequency converter.

In accordance with the present invention, a pulse train space converter for making the spaces in an input pulse train more nearly uniform comprises an input for providing an input command pulse train comprising positive and negative pulses. A suboperation control has inputs coupled to the input and outputs. A full adder has inputs connected to the outputs of the suboperation control and an output. An output connected to the output of the full adder provides an output pulse train. The output has a positive polarity output terminal and a negative polarity output terminal. A sign discriminator is connected between the input and the suboperation control for determining whether each output pulse is transferred to the corresponding output terminal. A negative feedback between the output and an input of the suboperation control feeds back the output of the output negatively and in a digital manner and provides an output pulse train free of abrupt frequency change. A mixer connected between the input and the sign discriminator prevents overlap of the fed back output and the command pulses.

Operation control means is connected to inputs of the full adder. A frequency divider is connected between the output, the full adder and the output for correcting disturbances in the intervals of the output pulses. The operation means comprises operation control circuit means having inputs and outputs. One of the inputs and one of the outputs are connected to the suboperation control. A differentiator is connected between an oscillator and an input of the operation control circuit means. A register is connected between an output of the operation control circuit means and an input of the full adder. An accumulator is connected between an output of the operation control circuit means and an input of the full adder.

In order that the present invention may be readily carried into effect, it will now be described with reference to the accompanying drawings, wherein.

Figure 1:
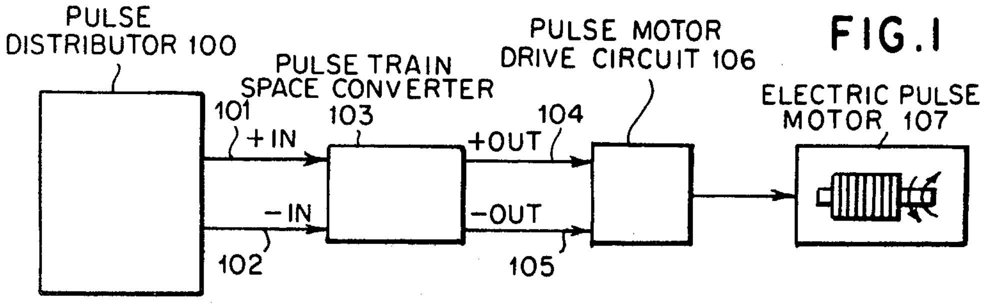
FIG. 1 is a block diagram of an embodiment of the space converter circuit arrangement of the present invention.

Referring to FIG. 1, a known pulse distributor 100 of an electronic computer or numerical control apparatus transmits command pulses to a line 101 when the hereinafter described electric pulse motor rotates in the positive direction, and transmits command pulses to line 102 when said motor rotates in the negative direction. The pulse train space converter 103 of the invention converts the pulses transmitted to line 101 or 102 to a pulse train in which frequency changes do not occur abruptly but gradually, and transmits the pulse train to line 104 or 105. A known pulse motor drive circuit 106 functions to switch the excitation of the electric pulse motor 107 in the predetermined sequence at each transmission of one pulse to line 104, to rotate said pulse motor in the positive direction, and to switch the excitation of the motor to the reverse direction at each transmission of one pulse to line 105, to rotate the motor in the negative direction.

It can be seen from FIG. 1, that the converter 103 is connected between the pulse distributor 100 and the electric pulse motor 101, or, more precisely, between the pulse distributor 100 and the pulse motor drive circuit 106.

Figure 2:
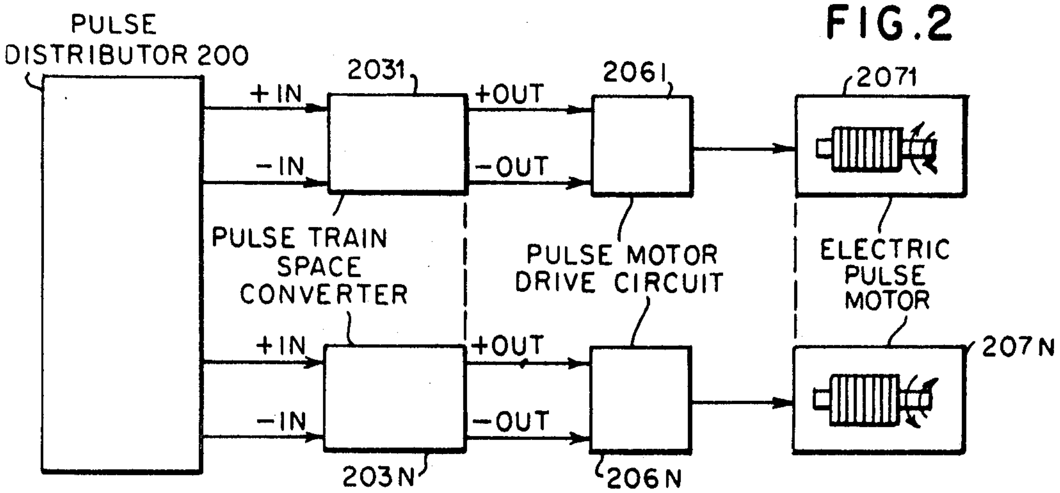
FIG. 2 is a block diagram of another embodiment of the space converter circuit arrangement of the present invention.

FIG. 2 illustrates another embodiment of the present invention. In FIG. 2, one pulse distributor 200 corresponds to several electric pulse motors 207l ..... 207N, and each of a plurality of pulse train space converters 203l ..... 203N, is connected between said pulse distributor 200 and a corresponding one of electric pulse motor drive circuits 206l ... 206N. The embodiment of FIG. 2 may thus be regarded as being directed to the control of N-axes, or N-dimensions.

Figure 3:
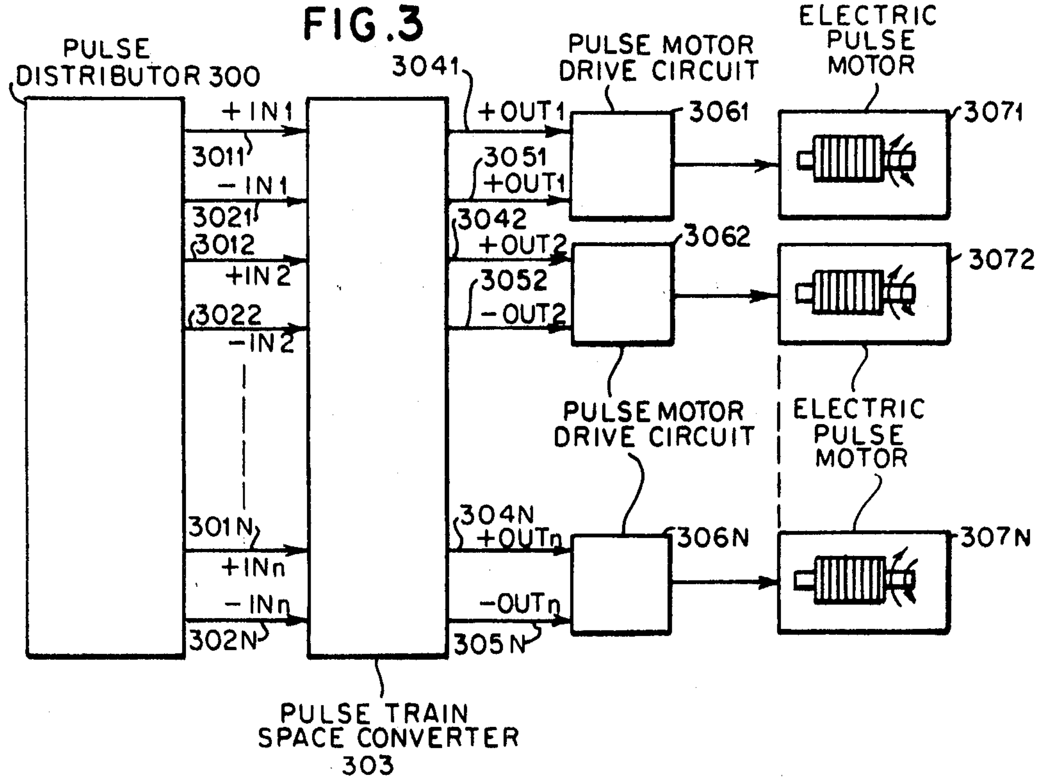
FIG. 3 is a block diagram of another embodiment of the space converter circuit arrangement of the present invention.

FIG. 3 illustrates still another embodiment of the space converter of the invention, which is similar to the embodiment of FIG. 2 in that a plurality of electric pulse motors 307l ... 307N. correspond to one pulse distributor 300 of an electronic computer or numerical control apparatus. The embodiment of FIG. 3 is different because a single pulse train space converter is used in common for all the drive units 306l ... 306N of the pulse motors 307l ...307N.

The lines 3011 and 3021 from the pulse distributor 300 correspond to lines 3041 and 3051 of the converter 303, which are the equivalents of lines 101, 102, 104 and 105, respectively, of FIG. 1. Other lines 3012 to 301N, 3022 to 302N, 3042 to 304N have the same significance as previously. The embodiment of FIG. 3 is thus also directed to the control of N-axes or N-dimensions, and the space conversion of command pulse trains from multiple axes are time-division processed by a single converter 303.

Figure 4:
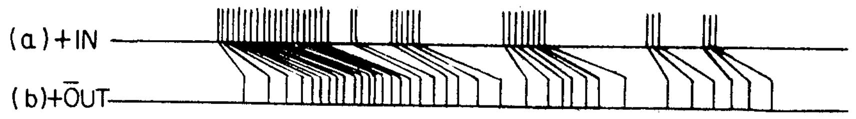
FIG. 4 is a graphical presentation illustrating the operation of the space converter circuit arrangement of the present invention to provide more nearly uniform spaces.

FIG. 4 illustrates the conversion of the spaces of a pulse train by the converter of the present invention. An input pulse train to the converter, that is, a command pulse train transmitted from the pulse distributor, is illustrated in curve *a* of FIG. 4. The output pulse train of the converter is illustrated in curve *b* of FIG. 4. Generally, the command pulses transmitted from the pulse distributor consist of a pulse train of a fixed frequency of which several pulses or a pulse group are reduced at regular intervals, as illustrated in curve *a* of FIG. 4. These are conveniently referred to as intermittent or instantaneous pulses. When such a command pulse train is directly fed to the servosystem, the servomotor operates erroneously at the point where the pulse frequency changes abruptly. When the command pulses are transferred through the converter of the present invention, the converter's output pulses have no abrupt frequency changes, as shown in curve *b* of FIG. 4. Any frequency changes in the output pulses appear only gradually. Consequently, by feeding the output pulses of the converter to the servosystem, the servomotor may even rotate at relatively high frequencies without erroneous operation.

Figure 5:
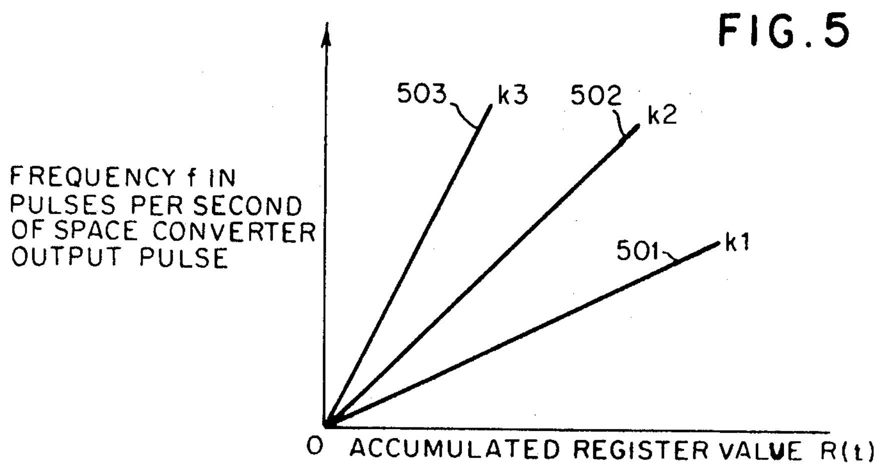
FIG. 5 is a graphical presentation illustrating the accumulative value of the command pulses in the register versus the output pulse repetition rate in the space converter circuit of the present invention.

FIG. 5 illustrates the relation or correlation of the accumulated value R($t$) of the register of the converter of the invention and the frequency of the output pulse of said converter. In FIG. 5, the abscissa denotes the accumulated value of the register obtained as the command pulses from the pulse distributor are accumulated, and the ordinate denotes the frequency of the output pulse train from the converter.

As shown by the linear functions 501, 502 and 503 of FIG. 5, the accumulated values of command pulses in the register of the converter are directly proportional to the frequency of the output pulse train from the converter. The slopes $k1$, $k2$ and $k3$ of the functions 501, 502 and 503, respectively, are the proportional constants, which are determined by the frequency, etc. of the hereinafter described timing pulse. Those constants are hereinafter referred to as the pulse conversion ratio.

Figure 6:
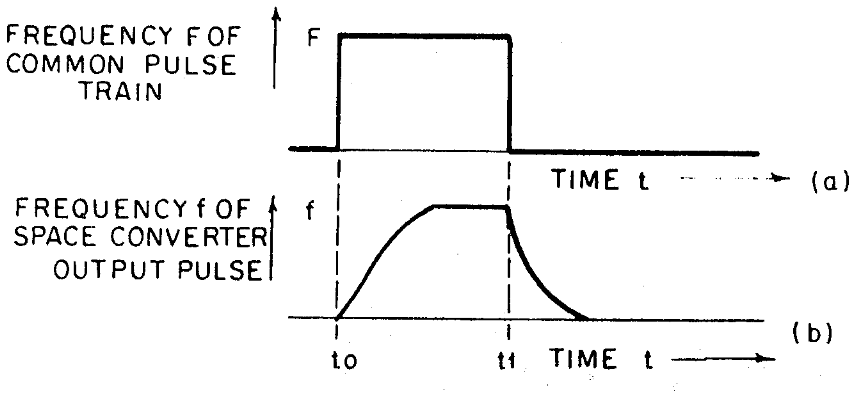
FIG. 6 is a graphical presentation illustrating the frequency variation of the output pulse train of the space converter circuit of the present invention.

FIG. 6 illustrates the frequency change in the output pulse train of the converter occurring when an instantaneous command pulse train is applied to said converter. In curve *a* of FIG. 6, the ordinate indicates frequency F of a common pulse train and the abscissa indicates time $t$. Therefore, the frequency of the command pulse train expressed in a rectangular form in curve *a* of FIG. 6 shows an instantaneous pulse train of which the frequency instantaneously increases to a fixed level at time *to*, and also instantaneously decreases to zero at time *tl*.

When the command pulse train of curve *a* of FIG. 6 is supplied to the space converter circuit of the present invention, an output pulse train, as shown in curve *b* of FIG. 6, is obtained at the output of the converter. The frequency of curve *b* of FIG. 6 gradually increases exponentially with passage of time from point *to* until a specific fixed valve is attained, and commencing at the point *tl*, the frequency gradually decreases exponentially.

Figure 7:
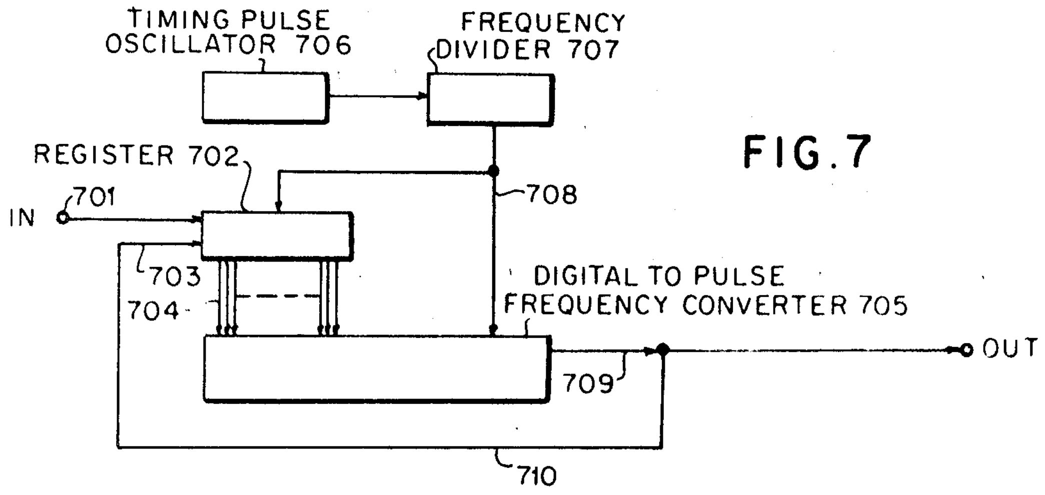
FIG. 7 is a block diagram of an embodiment of the space converter circuit arrangement of the present invention.

FIG. 7 shows a pulse train space converter of the present invention. The circuit of FIG. 7 is a unidirectional converter, as an example. The input terminal 701 corresponds to line 101 of FIG. 1. A register 702 stores the command pulses supplied to the input terminal 701. The register 702 comprises a known reversible counter.

The terminal 701 is an addition input terminal. As each command pulse is supplied to the input terminal 701, the accumulation in the register 702 is increased by one. A terminal 703 is a subtraction input terminal of the register 702. Each time a pulse is supplied to the terminal 703 of the register 702, the value in said register is reduced by one. An output terminal 704 of the register 702 may feed the accumulated value in said register to a digital to pulse frequency converter 705, as parallel signals. A timing pulse oscillator 706 is provided. A frequency divider 707 divides the timing pulse train into pulse trains of suitable frequencies. The pulse trains of each fixed frequency transmitted from the frequency divider 707 to the line 703 are fed to the digital to pulse frequency converter.

The converter 705 reads the accumulated value in the register 702 each time a pulse is fed through a line 708, conducts a pulse distribution operation based on the read value, and determines whether or not a pulse should be transmitted to an output line 709 of the converter. The digital to pulse frequency converter operates on a principle similar to that of pulse distributors known in field of numerical control of machine tools, etc., such as a binary rate multiplier (MIT system), digital differential analyzer (DDA system), etc. It is thus apparent that if the accumulated value stored in the register 702 is constant, a pulse train of a frequency proportional to the accumulated value in the register is provided in the output line 709.

The pulse transmitted to the output line 709 is fed to the subtraction input terminal 703 of the register 702, via a feedback circuit 710, thereby reducing the accumulated value stored in the register by one. Thus, although the command pulse trains fed to the input terminal 701 are intermittent or instantaneous, the pulses are accumulated in the register 702, and output pulse trains of a frequency proportional to the instantaneously changing accumulated value are transmitted to the output line 709. Thus no abrupt frequency change occurs in the output pulses appearing in the output line 709, and the frequency changes only gradually. Since the output pulses are fed to the subtraction input terminal 703 of the register 702 via the line 710, when a number of output pulses equal to those in the command pulse train fed to the input terminal 701 are transmitted to the line 709, the accumulated value in said register becomes zero. Consequently, when computation command pulses are supplied in the line 708 thereafter, no pulse is transmitted to the output line 709.

The frequency change in the output pulse with the passage of time, occurring when an instantaneous command pulse is supplied to the converter, is now explained with reference to the converter of FIG. 7, as well as FIGS. 5 and 6.

The output pulse frequency F, in pulses per second, of the converter is directly proportional to the corresponding accumulated value in the register 702, as indicated in FIG. 5. This relationship may be expressed by the following equation, using the pulse conversion ratio $k$, and the output pulse frequency $f$, in pulses per second, of the frequency divider 707.

$$F = fk(\mathrm{IR})$$

When a command pulse train or instantaneous pulse train of a fixed frequency $fo$ is fed as an input to the pulse train space converter of the present invention, the time delay in the output pulse train of the converter is indicated by the equation $$R(t) = So(t) - S(t) = fo\,t - \int f(t)\,dt \quad (1)$$

Also, $$R(t) = \frac{1}{k} f(t) \quad (2)$$

From the foregoing Equations (1) and (2), $$\frac{1}{k} f(t) = fo\,t - \int f(t)\,dt$$

$$\frac{1}{k}\frac{df(t)}{dt} + f(t) - fo = 0$$

Therefore, $$f(t) = fo(1 - e^{-kt})$$

wherein $fo$ represents the frequency of the command pulse, which is constant, $So(t)$ is the number of command pulses, $f(t)$ is the frequency of the output pulse train of the converter, $S(t)$ is the number of pulses in the output pulse train of the converter, $R(t)$ is the accumulated value in the register, and $k$ is the pulse conversion ratio.

Accordingly, the propagation ratio of the output pulse frequency at a time $t$ may be expressed as $$\frac{f(t)}{fo}=(1-e^{-kt}) \tag{3}$$

The time required for attaining an arrival ratio of 90% is $$t\geqq\frac{2.30}{k}$$

Again, because $$\begin{aligned}S(t)&=\int f(t)dt\\&=fo\int(1-e^{-kt})dt\\&=fo\left(t+\frac{1}{k}e^{-kt}-\frac{1}{k}\right)\end{aligned} \tag{4}$$

$R(t)$ can be expressed as $$\begin{aligned}R(t)&=fo\ t-fo\left(t+\frac{1}{k}e^{-kt}-\frac{1}{k}\right.\\&=\frac{fo}{k}(1-e^{-kt})\end{aligned} \tag{5}$$

The ratio of the output pulse quantity to the number of command pulses at time $t$ is calculated as $$\begin{aligned}\frac{S(t)}{So(t)}&=1-\frac{R(t)}{So(t)}\\&=1-\frac{1}{tk}(1-e^{-kt})\end{aligned} \tag{6}$$

The time delay in the output pulse will now be examined when the command pulse instantaneously stops or rests from the condition in which the frequency $fo$ of the command pulse train equals the frequency $f(t)$ of the output pulse train of the converter, that is $fo=f(t)$.

The time at which the command pulse train stops is set to be $t_1$. The accumulated value of the register at the time $t_1$ is $R(t_1)$. The output pulse frequency at the time $t_1$ is $f(t_1)$. The command pulse number at the time $t_1$ is $So(t_1)$. The output pulse number at the time $t_1$ is $S(t_1)$. Then, $$\begin{aligned}R(t)&=R(t_1)-S(t)\\&=R(t_1)-\int f(t)dt\end{aligned}$$

Therefore, $$\frac{f(t)}{k}=R(t_1)-\int f(t)dt$$

$$\frac{1}{k}\frac{df(t)}{dt}+f(t)=0$$

Therefore, $$f(t)=f(t_1)e^{-kt}$$

Also, because $$\begin{aligned}R(t)&=R(t_1)-S(t)\\&=R(t_1)-\int_0^t f(t)dt\\&=R(t_1)-\frac{f(t_1)}{k}(1-e^{-kt})\\&=R(t_1)e^{-kt}\end{aligned}$$

the time required for attaining $R(t)$ which is less than 1 may be calculated as $$1>R(t_1)e^{-kt}$$

so that $$t>\frac{1}{k}\log R(t_1)$$

Such increasing or leading and trailing characteristics of the frequency of the output pulse train from the pulse train space converter are very precise in time, since all pulse conversions are digitally performed. Consequently, the characteristics may be utilized for controlling the transmission speed of the pulse distributor in numerical control apparatus. It is also possible to let the machine tool trace a curve close to a circular arc, by supplying not only the series pulse train information to the register, but the information about various increments ($\Delta X$, $\Delta Y$) linearly simulated to a circular arc supplied from an electronic computer or numerical control apparatus.

The aforedescribed pulse conversion ratio $k$ may be optionally selected. That is, the pulse oscillator 706 of FIG. 7 is a variable frequency oscillator. The frequency is continuously variable, while it is normally semifixed. The set value may be varied by externally supplied digital information. Obviously, the oscillator frequency $f$ and the pulse conversion ratio $k$ should be set in correspondence with the characteristics of an electric servosystem such as, for example, an electric pulse motor.

Figure 8:
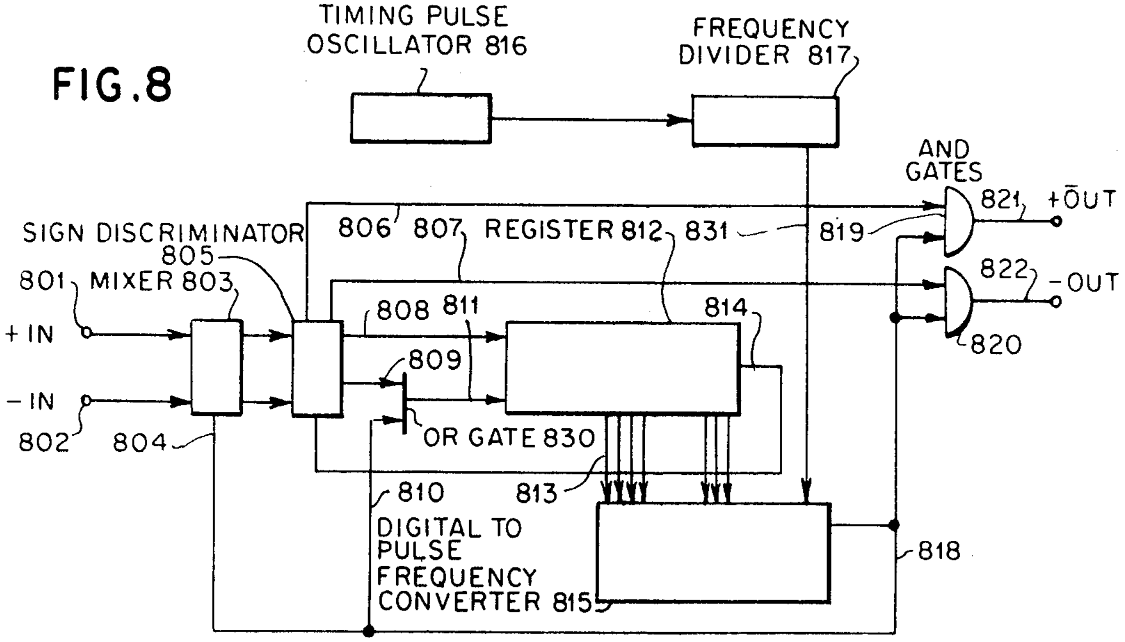
FIG. 8 is a block diagram of another embodiment of the space converter circuit arrangement of the present invention.

FIG. 8 is another embodiment of the pulse train space converter of the present invention. The embodiment of FIG. 8 is basically the same as that of FIG. 7, but differs due to a set of positive and negative input terminals provided in the converter of FIG. 8. The embodiment of FIG. 8 therefore constitutes a bidirectional converter, which may be used instead of the converter 103 of FIG. 1, or the converters 2031 ..... 203N of FIG. 2.

In FIG. 8, 801 is a positive input terminal and 802 is a negative input terminal. The terminals 801 and 802 are connected to line 101 and 102, respectively, in FIG. 1. A mixer 803 functions to prevent time-overlapping of command or instruction pulses supplied to the terminal 801 or 802 with the feedback signals at the terminal 804. A sign or polarity discriminator 805 determines whether each output pulse from the digital to pulse converter should be transmitted to the positive or negative output terminal, and accordingly, supplies a gate signal to either line 806 or 807 to switch a gate to its conductive condition. The sign discriminator 805, also determines to which of the register terminals, that is, the addition input terminal 808 or the subtraction terminal 811, the command pulse supplied to the terminal 801 or 802 should be applied.

The feedback signals are supplied via a feedback signal terminal 810 to the addition input terminal 811 of the register 812 via an OR-gate 830. The accumulated value of the register 812 is either zero or positive. If it is zero, a signal is provided in the line 814. The register 812 has a register output terminal 813. A digital to pulse frequency converter 815 is provided. Similarly to the embodiment of FIG. 7, a pulse oscillator 816, a frequency divider 817 are provided and a line 831 supplies the fixed frequency signals from the frequency divider to the digital to pulse frequency converter 815. The output from the frequency converter 815 is supplied to an AND-gate 819 or 820, and to the feedback terminal 810 via a line 818. The pulse transmitted to the line 818 is led to either an output terminal 821 or 822 of the pulse train space converter via the gate 819 or 820 in accordance with the instruction of the sign discriminator 805.

Figure 14:
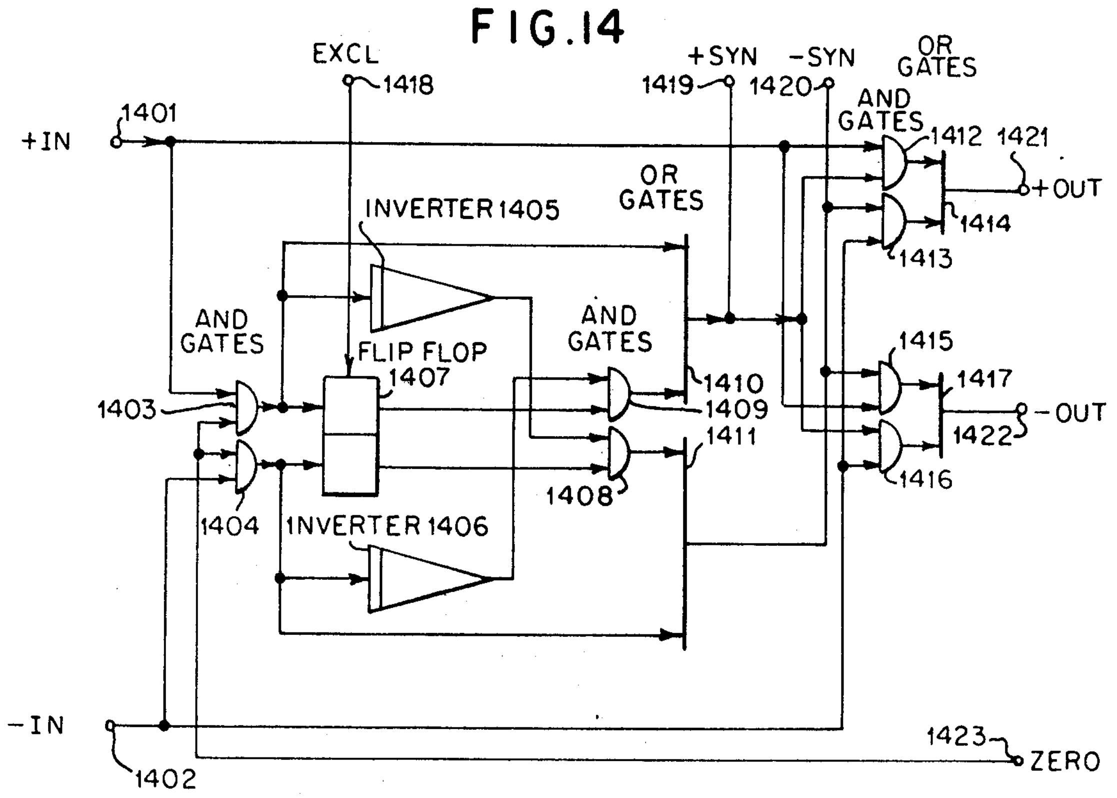
FIG. 14 is a block diagram of an embodiment of a sign or polarity discriminator which may be utilized in the space converter circuit arrangement of the present invention.
Figure 13:
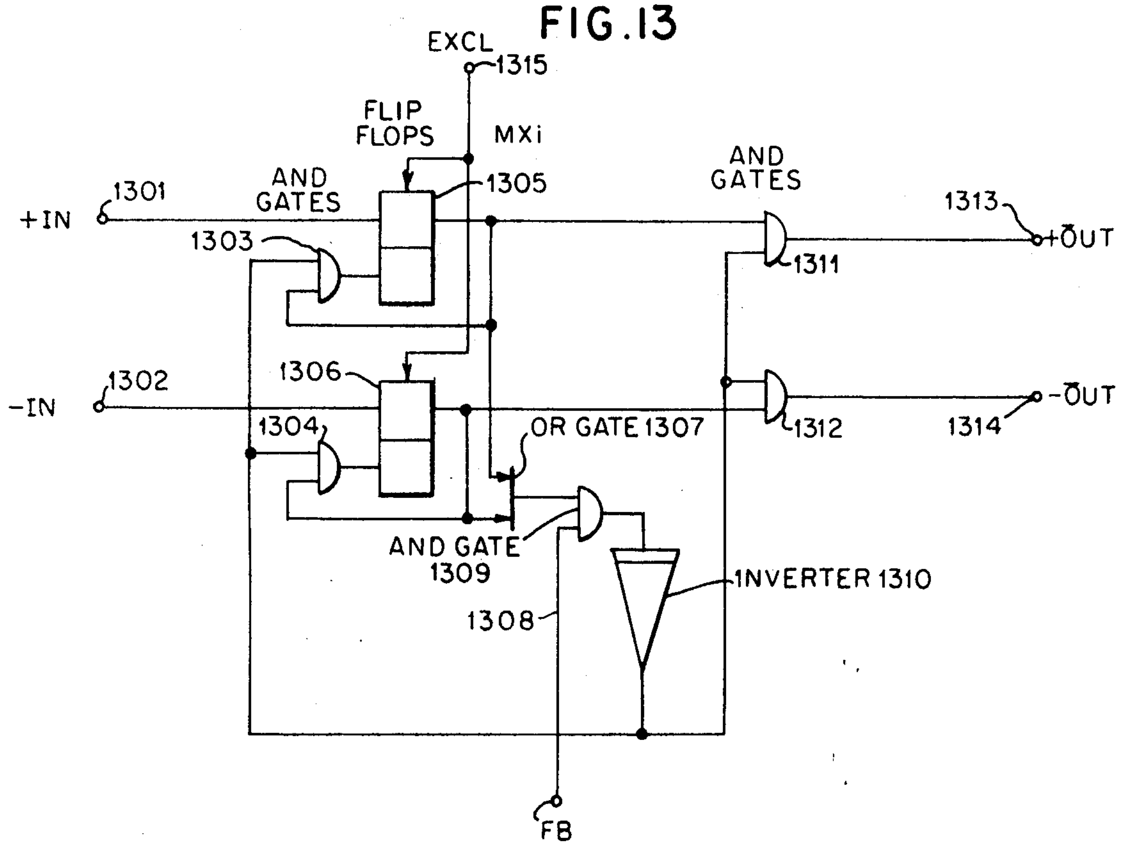
FIG. 13 is a block diagram of an embodiment of a mixer which may be utilized in the space converter circuit arrangement of the present invention.

The particulars of the mixer 803 and sign discriminator 805 in the pulse train space converter of FIG. 8 are illustrated in detail in FIGS. 13 and 14. Assuming that the accumulated value in the register 812 of FIG. 8 is zero, when an instruction pulse arrives at the positive input terminal 801, the presence or absence of a feedback signal is confirmed at the mixer 803. If there is no feedback signal, the command pulse is sent to the sign or polarity discriminator 805 which detects the pulse and confirms it as being from the positive terminal 801. Subsequently, a signal is sent to the line 806 to switch the gate 819 to its conductive condition. Simultaneously, the command pulse fed through the mixer 803 is applied to the addition input terminal 808 of the register 812. If additional instruction pulses are successively supplied to the terminal 801, they are similarly applied to the register addition input terminal 808 to be sequentially stored in the register 812. On the other hand, since the fixed frequency timing pulses from the frequency divider 817 are applied to the digital to pulse frequency converter 815 through the line 814, each time a timing pulse is added to said converter, pulse distribution occurs at said converter based on the accumulated value in the register 812. As previously stated, the distribution operation is effected to provide a pulse train having a frequency directly proportional to the accumulated value in the register at any time.

The output pulse from the converter 815 is provided at the positive output terminal 821, through the line 818 and the gate 819. The output pulse of the converter 815 is simultaneously applied to the subtraction input terminal 811 of the register 812 via lines 818 and 810 and the OR-gate 830. Each time a pulse is supplied to the terminal 811, the accumulated value in the register 812 is reduced by one. If a feedback signal and a command pulse are supplied simultaneously, the mixer 803 delays the instruction pulse by a fixed time, and transmits it to the register 812 after processing the feedback signal.

The value accumulated in the register 812 is stabilized, for example, when the frequency of the command pulse fed to input terminal 801 coincides with that of the output pulse train transferred to the output terminal 821 of the pulse train space converter. When a command pulse is supplied to the negative input terminal 802 and a signal indicating that the accumulated value in the register 812 is not zero is fed to the sign discriminator 805 via the line 814, the command pulse is sent to the subtraction input terminal 811 of said register. This reduces the accumulated value by one, similarly to the case of the feedback signal.

As the time elapses, the accumulated value in the register 812 is decreased to zero. If command pulses continue to be supplied to the negative input terminal 802, even after the value in the register 812 becomes zero, the sign discriminator 805 operates because a signal is provided on line 814, and consequently switches the gate 819 to its nonconductive condition and switches the gate 820 to its conductive condition. The sign discriminator 805 supplies the command pulses to the addition input terminal 808 of the register 812 to accumulate the pulses in the register, one by one. Therefore, the output of the digital to pulse frequency converter 815 is transferred to the negative output terminal 822 via the line 818 and the AND-gate 820.

Figure 9:
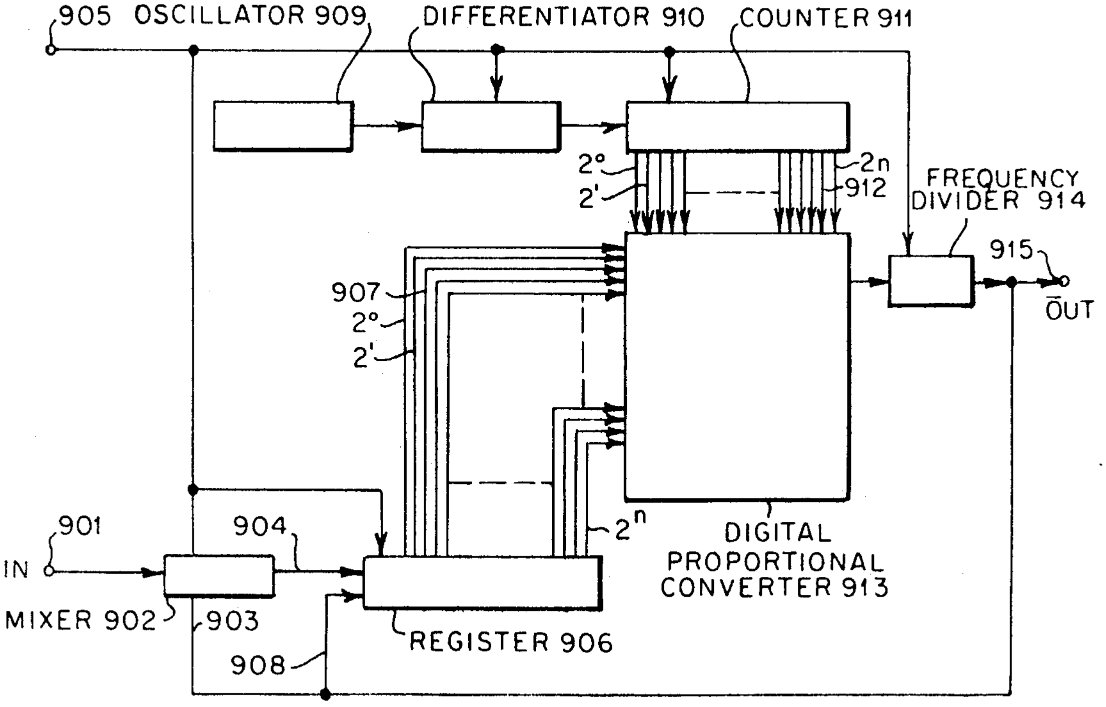
FIG. 9 is a block diagram of another embodiment of the space converter circuit arrangement of the present invention.

FIG. 9 illustrates another embodiment of the pulse train space converter of the invention. The embodiment of FIG. 9 utilizes the pulse distribution principle of the MIT system (binary rate multiplier) for the digital to pulse frequency conversion. Furthermore, the embodiment is formed as a unidirectional pulse train space converter.

In FIG. 9, an input terminal 901 is provided. A mixer 902 prevents overlapping of a command pulse supplied to the terminal 901 with a feedback signal supplied to the terminal 903. Pulses supplied to the terminal 901 are supplied to the mixer 902. The mixer 902 has an output line 904. A clock pulse train having a frequency several times greater than that of the command pulse train supplied to the terminal 901 is supplied to a clock pulse terminal 905. The command pulses at the terminal 901 are synchronized with the clock pulses.

In FIG. 9, a register 906 comprises a reversible counter and the command pulses from the terminal 901 are fed to the addition input terminal of said register 906 via the line 904. The register 906 has a register output terminal 907 which selects the output ($2^0, 2^1, \ldots 2^{n-1}, 2^n$) in accordance with the accumulated value in the register. A terminal 908 feeds back the output from the digital to pulse frequency converter to the register 906. A variable frequency oscillator 909 is set to generate pulses of predetermined frequency. A differentiator 910 detects the increases of the pulse from the oscillator 909 to precisely synchronize the clock pulse. A counter 911 counts the pulses from the differentiator 910 and simultaneously transmits to the output lines 912 of said counter binary parallel signals corresponding to the counted value. A digital proportional converter 913 comprises AND gates and an OR gate. The register 906, counter 911 and the proportional converter 913 together form a digital to pulse frequency converter.

A frequency divider 914 divides or multiplies by $1/n$ times, the output of the digital proportional converter 913 to correct disturbance in the intervals of the output pulses and to increase the accuracy of the pulse intervals. As shown in FIG. 9, the signals from the counter 911 and the accumulated value in the register 906 are supplied as the input to the digital proportional converter 913 without change. Full details of the converter operation are hereinafter described. The output terminals of the register 906 are connected to the converter 913 from the highest order digit to successively lower order digits. The output terminals of the counter 911 which are connected to the converter 913 from the lowest digit to successively higher digits, each combination being effected by an AND gate. All the combinations are integrated by an OR gate.

The logical condition for the output of the converter 913 is $$OUT=(IR2^\circ \wedge PC2^n)^v(IR2^1 \wedge PC2^1 > PC2^{n-1})^v \ldots \ldots v(IR2^{n-1} \wedge PC2^1)^v(IR2^n \wedge PC2^\circ)$$

wherein $IR2^1$ and $PC2^1$ are the outputs of the first unit of the register 906 and the counter 912, respectively.

If it is assumed that the accumulated value in the register 906 is maintained at a fixed level, the following relationship exists between the frequency $F$ of the output pulse train of the pulse train space converter and the frequency $f$ of the pulses from the oscillator 909

$$F=(1/n)k(f)$$

wherein $k$ is a constant and is the conversion ratio, the value of $k$ being $0 \leqq k \leqq 1$. The constant $k$ becomes 1 when the register 906 is at the full count.

Figure 10A:
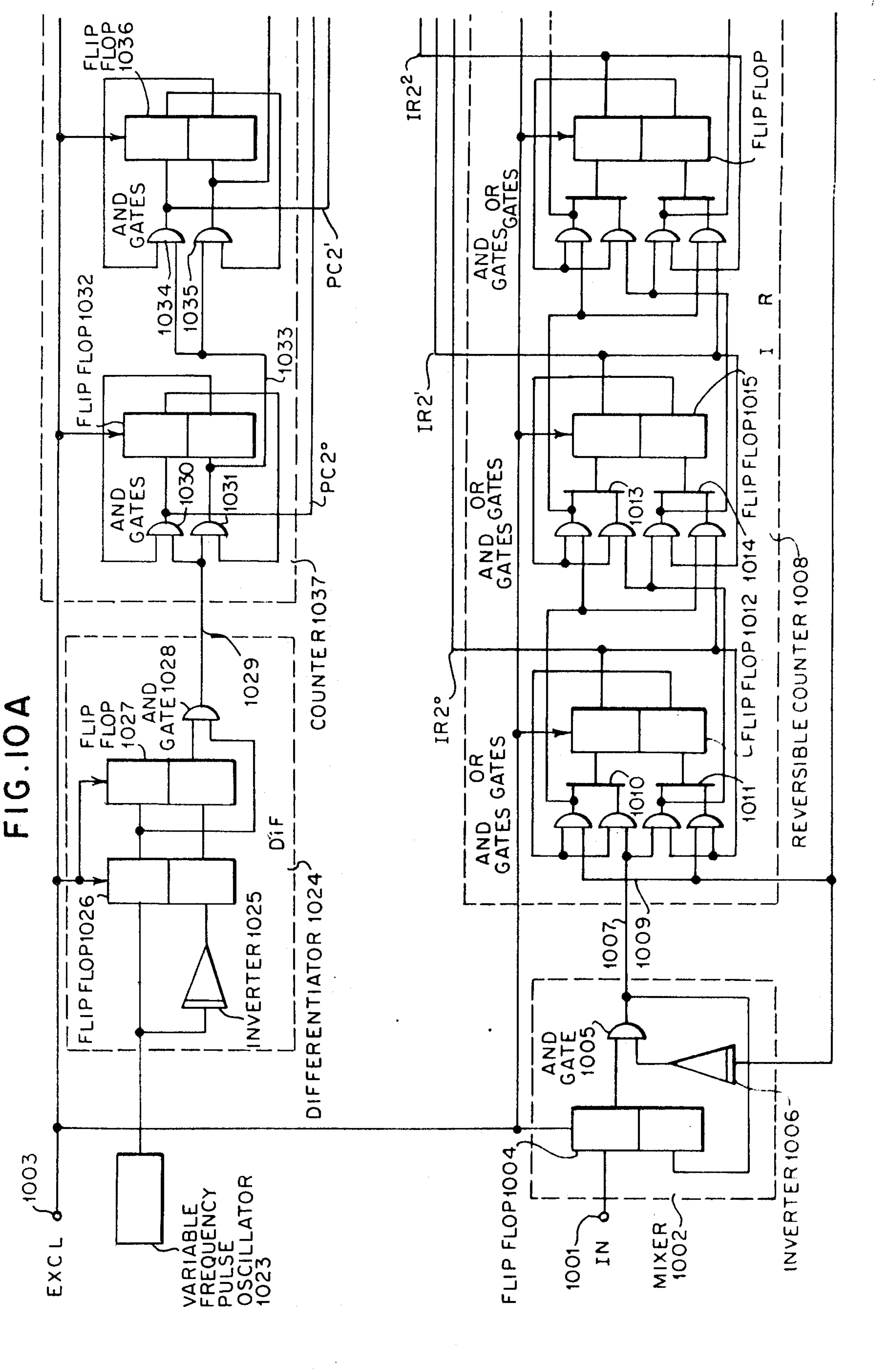
FIGS. 10A and 10B are a circuit diagram of the space converter circuit arrangement of the present invention.
Figure 10B:
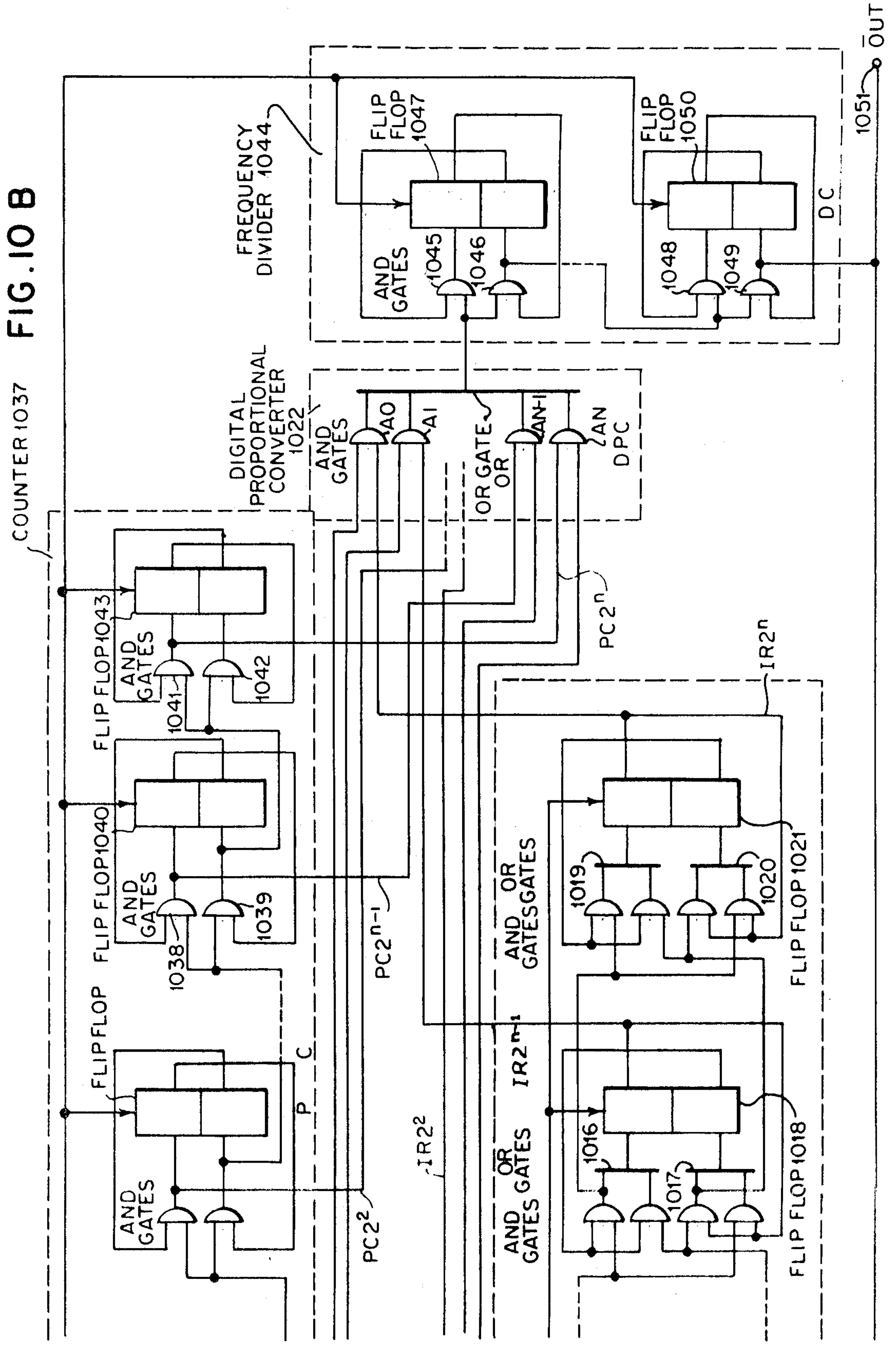

FIG. 10, comprising FIGS. 10A and 10B, is a circuit diagram of the pulse train space converter of FIG. 9. In FIG. 10, the command pulse train is supplied to an input terminal 1001. A mixer 1002 prevents overlapping of a command pulse with a feedback signal. A block pulse terminal 1003 is provided. The mixer 1002 comprises a flip-flop 1004, an AND-gate 1005, and an inverter 1006. When one command pulse is supplied to the input terminal 1001, the flip-flop 1004 is set by the next clock pulse.

Since the AND-gate 1005 is kept open in the absence of a feedback signal, is supplied to a line 1007, and the flip-flop 1004 is reset by the next clock pulse. Consequently, a pulse with a duration corresponding to one clock interval is fed to the line 1007. If a command pulse is supplied to the terminal 1001 while a feedback signal is present, the AND-gate 1005 is switched to its nonconductive condition via the inverter 1006. Therefore, no pulse is fed to the line 1007 until the feedback signal disappears. After the disappearance of the feedback pulse, a pulse is supplied to the line 1007 similarly to the foregoing.

In FIG. 10, a reversible counter 1008 comprises $n$ flip-flops and serves as the aforedescribed register. The line 1007 is the addition input terminal of the reversible counter 1008 and 1009 is the subtraction input terminal. As shown in FIG. 10, the first digital element is indicated by four AND gates, two OR-gates 1010 and 1011, and one flip-flop 1012, and the first digital output is indicated as $IR2^o$. Similarly, four AND gates two OR-gates 1013 and 1014, and on flip-flop 1015 form the second digital element, and its output is indicated as $IR2^1$. Again four AND gates, two OR-gates 1016 and 1017, and one flip-flop 1018 form the $n-1$th digital element and four more AND gates, two OR-gates 1019 and 1020, and one flip-flop 1021 form the $n$th digital element.

$IR2^{n-1}$ and $IR2^n$ denote the $n-1$th digital output and the $n$th digital output of the counter. A pulse oscillator 1023 is a variable frequency pulse oscillator and normally produces pulses of a constant frequency approximately several times less than that of the clock pulse. A differentiator 1024 comprises an inverter 1025, two flip-flops 1026 and 1027 and an AND-gate 1028. The differentiator 1024 detects the increase of the pulse from the oscillator and synchronizes it with the clock pulse, as hereinbefore stated.

When no pulse is sent from the oscillator, the two flip-flops 1026 and 1027 are reset. If a pulse is sent from the oscillator 1023, the flip-flop 1026 is set when the first clock pulse is supplied and the output is derived via the AND-gate 1028. Upon the supply of the next clock pulse, the flip-flop 1027 is set and the AND-gate 1028 is switched to its nonconductive condition. Consequently, a pulse with a duration corresponding to one cycle of the clock pulse is provided at the AND-gate 1028. When the pulse from the oscillator 1023 disappears, the flip-flop 1026 is reset upon the supply of a clock pulse. The flip-flop 1027 is also reset by the next clock pulse and the initial state is restored.

The differentiator 1024 has an output line 1029, which is also an input line of a counter 1037. The counter 1037 shows the details of the counter 911 of FIG. 9. Each digital element of the counter 1037 comprises two AND gates and one flip-flop. The first digital element of the counter 1037 comprises two AND-gates 1030 and 1031 and one flip-flop 1032. The output terminal of the AND-gate 1030 is connected to the set input terminal of the flip-flop 1032 and the AND-gate 1031 is connected to the reset input terminal of the flip-flops 1032.

Similarly, the second digital element comprises two AND-gates 1034 and 1035 and one flip-flop 1036. The AND-gates 1038 and 1039 and the flip-flop 1040 form the $n-1$th digital element and AND-gates 1041, 1042 and a flip-flop 1048 form the $n$th digital element. The set input terminals of the flip-flops of the elements of the counter 1037 are connected to the digital proportional converter 1022. The digital proportional converter comprises $n+1$ AND gates, A0, Al, ... AN, AN, of a number equal to the digits in the aforesaid reversible counter 1008 and counter 1037, and one OR gate OR, which is connected to the outputs of said AND gates.

In the digital proportional converter 1022, the output of the highest digital element of the reversible counter or the register 1008 and the output of the lowest digital element of the counter 1037 are used as the input of AND-gate A0. The outputs of the register $IR2^n$ and the counter $PC2^o$ are supplied as the input of the AND-gate A0. Similarly, the outputs $IR2^{n-l}$ and $PC2^1$ are the input of the AND-gate A1 and the outputs $IR2^o$ and $PC2^n$ are the input of the AND-gate AN. The outputs of all the AND-gates A0, Al, ..... AN, are collected by one OR gate OR and are supplied to a frequency divider 1044 as the input.

The frequency divider 1044 is not an essential element of the present invention. It functions to reduce the frequency of the output pulse from the digital proportional converter to $1/n$. In principle, the frequency divider 1044 may be dispensed with, but the abrupt changes in pulse frequency of the output pulse train from the pulse train space converter may be further reduced by having the pulse oscillator 1023 generate pulses of $n$ times greater frequency than those usable when no frequency divider 1044 is used and reducing the frequency of the output pulse train of the digital proportional converter 1022 to $1/n$ with said frequency divider.

The construction of the frequency divider 1044 is similar to that of the counter 1037. The element of each digit comprises two AND gates and one flip-flop. The first digital element comprises AND-gates 1045 and 1046 and a flip-flop 1047 and the highest digital element comprises AND-gates 1048 and 1049 and a flip-flop 1050. The output terminal of the digital proportional converter is connected to the AND-gates 1045 and 1046 of the first digital element of the frequency divider 1044 to supply an input to said gates. The output of the AND-gate 1045 is the set input of the flip-flop 1047 and the output of the AND-gate 1046 is the reset input of the flip-flop 1047. The reset output of the flip-flop 1047 comprises another input to the AND-gate 1045, and the set output of the flip-flop 1047 is another input to the AND-gate 1046. The reset input of the flip-flop 1047 of the first digital element is supplied as one input to each of the two AND gates of the next digit elements.

The input to the reset end of the highest unit digital element is simultaneously fed to an output terminal 1051 as the frequency divider 1044 output, which is the output of the pulse train space converter. The pulse transmitted to the output terminal 1051 is supplied to the subtraction input terminal of the reversible counter or register 1008 through the feedback line 1009, for the reason mentioned. The output is also simultaneously fed to the inverter 1006 of the mixer 1002.

In the embodiment of FIG. 10, the frequency $f$, in Hertz, of the variable frequency oscillator 1023 must be equal to or higher than the highest possible frequency FM, in pulses per second, of the command pulse train applied to the terminal 1001. Thus, $$f \geq \frac{n}{k}(F)$$

wherein $k$ is the conversion ratio and $n$ is the multiplier of the frequency divider such as, for example, $1/n$. The maximum value of $f$ is determined in consideration of the characteristics of a servosystem or conditions on the load.

Figure 11:
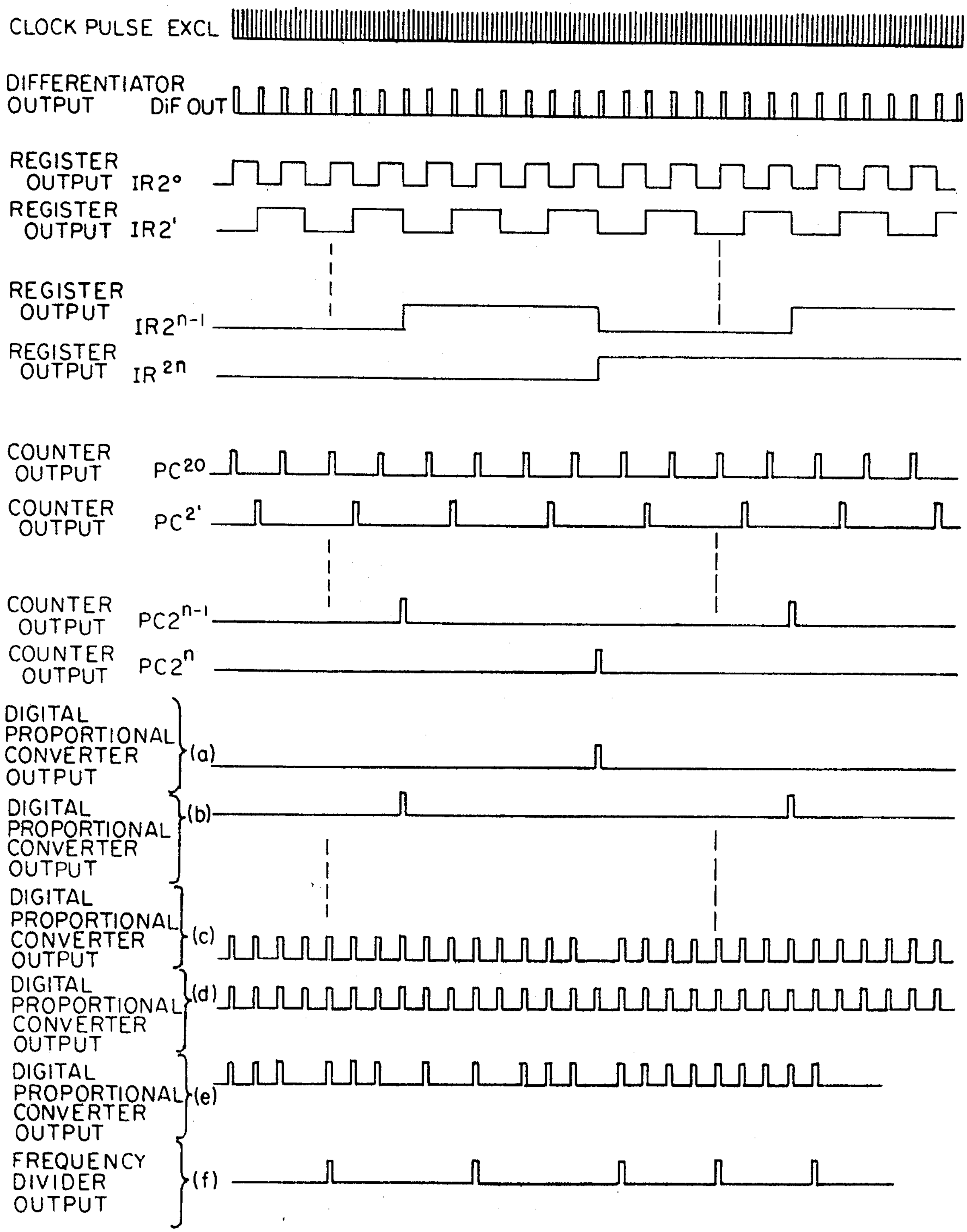
FIG. 11 is a graphical presentation illustrating waveforms appearing at various points in FIGS. 10A and 10B.

FIG. 11 illustrates pulse waveforms for explaining the operation of the pulse train space converter of FIG. 10. In FIG. 11, EXCL is the clock pulses to be supplied to the clock pulse terminal of FIG. 10 which forms a pulse train of a fixed frequency within the range of 500 kilopulses per second to 4,000 kilopulses per second. DiF out is the output pulse waveform of the differentiator 1024 of FIG. 10, formed by synchronizing the pulse from the oscillator 1023 with the aforementioned clock pulse. The pulse duration equals one cycle of the clock pulse.

The waveforms $IR2^o$, $IR2^1$, ..... $IR2^n$ are the outputs of each digital unit of the register 1008 of FIG. 10. The waveforms $PC2^o$, $PC2^1$, ..... $PC2^n$ are the outputs from each digital unit element of the counter 1037 of FIG. 10. Curves $a$ to $d$ of FIG. 11 illustrate the waveforms of the output pulses transferred to the input terminal of the digital proportional converter 1022 before the counter 1037 reaches its full count condition, assuming that the content of the register 1008 is constant.

The curve $a$ of FIG. 11 illustrates a situation in which the accumulated value in the register 1008 is 1, that is, when $IR2^o$ alone is 1 and the others are 0. The waveform of the output pulse derived from the digital proportional converter 1022, before the content of the counter 1037 changes from zero to full count, is illustrated in the curve $a$. Curve $b$ of FIG. 11 shows the output pulse waveform obtained when the accumulated value of the register is 2, that is, when $IR2^1$ alone is 1 and the others are o.

Curve $c$ of FIG. 11 shows the output waveform provided when the accumulated value of the register is $2^o+2^1+\ldots+2^{n+1}$. Curve $d$ of FIG. 11 shows the output waveform of the digital proportional converter 1022, provided when the accumulated value in the register is $2^o+2^1+\ldots+2^{n+1}+2^n$. Curve $e$ of FIG. 11 is an example of the output waveform of the digital proportional converter 1022. Curve $f$ of FIG. 11 shows the pulse waveform after passing through the frequency divider 1044 which multiplies its input by 1/n, when n is four.

Figure 12:
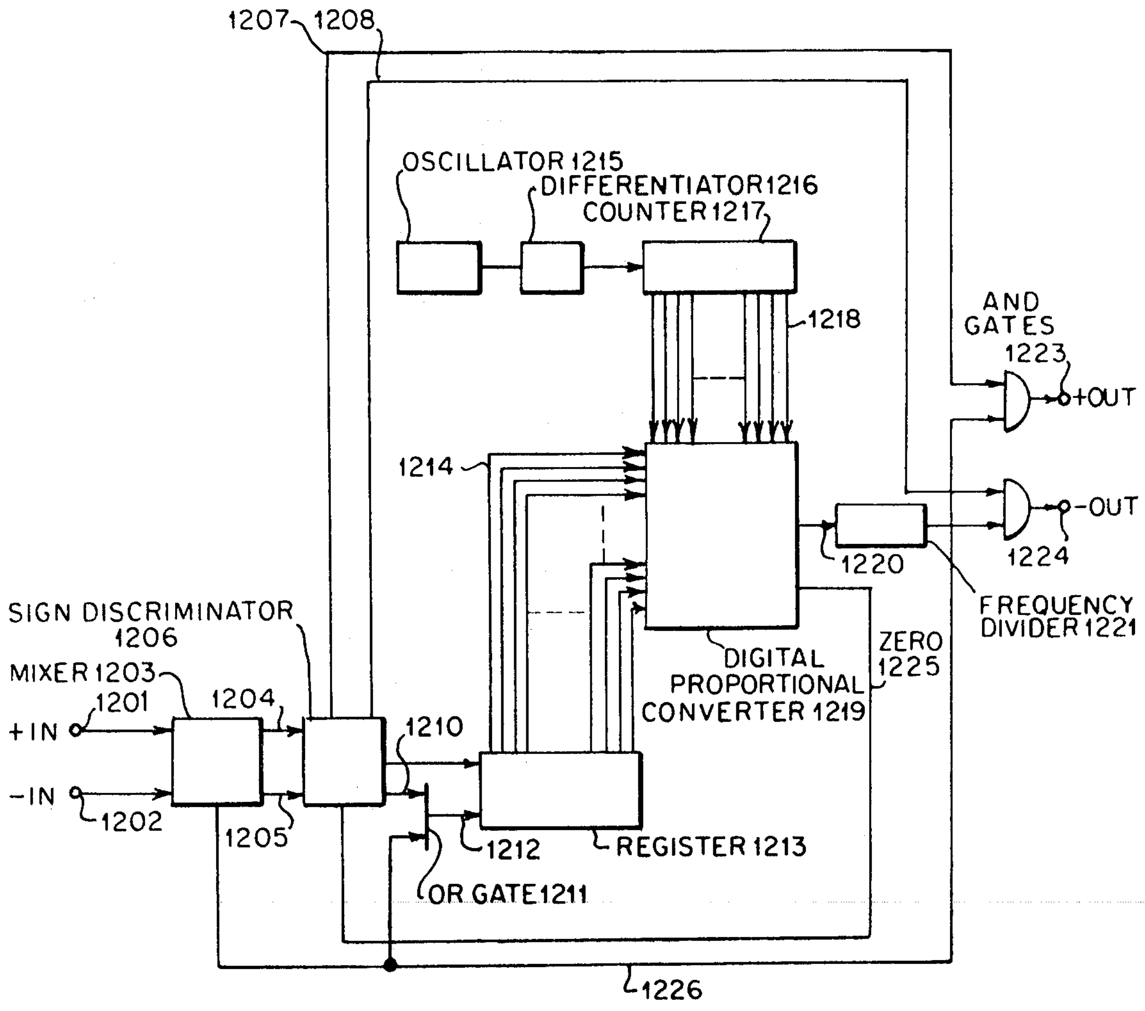
FIG. 12 is a block diagram of another embodiment of the space converter circuit arrangement of the present invention.

Still another embodiment of the pulse train space converter of the invention is illustrated in FIG. 12. The embodiment of FIG. 12 is basically the same as that of FIG. 10, but differs in that the converter has two input terminals, and consequently is a bidirectional, positive and negative, converter.

In FIG. 12, an input terminal 1201 has a positive command pulse train supplied thereto. An input terminal 1202 has a negative command pulse train supplied thereto. A mixer 1203 prevents overlapping of a command pulse with a feedback signal at the terminal 1201 or 1202, which transfers the command pulse to a sign or polarity discriminator 1206 via a line 1204 or 1205, when there is an overlap. As hereinafter described, the sign discriminator 1206 determines whether the pulse in the line 1204 or 1205 should be supplied to the addition input terminal 1209 of the register or reversible counter 1213, or to another addition input terminal 1212 via a line 1210 and an OR-gate 1211. The discriminator circuit 1206 further determines whether the output from the digital proportional converter 1219 should be supplied to the positive or negative output terminal of the pulse train space converter and transmits a signal to the line 1207 or 1208 accordingly.

In FIG. 12, the register 1213 has an output line 1214. A variable frequency oscillator 1215 is set to generate pulses of a fixed frequency. A differentiator 1216 and a counter 1217 are provided. The counter 1217 has an output line 1218. A digital proportional converter 1219 has an output line 1220. A frequency divider 1221 multiplies by 1/n, similarly to FIGS. 9 and 10.

Since FIG. 12 is a bidirectional pulse train space converter, the output pulse of the frequency divider circuit 1221 is transmitted either to the positive output terminal 1223 or negative output terminal 1224 of the converter via an AND-gate 1222 which is controlled by the sign discriminator 1206. The digital proportional converter 1219 detects that the accumulated value in the register 1213 is zero and thereupon send a signal to the sign discriminator 1206 via line 1225. Similarly to the preceding embodiment, the output pulse of the frequency divider circuit 1221 is supplied to the subtraction input terminal 1212 of the register 1213 via a line 1226 and the OR-gate 1211.

FIG. 13 illustrates the circuit of the mixer 803 or 1203 in the bidirectional pulse train space converter of FIGS. 8 or 12. In FIG. 13 an input terminal 1301 has positive command pulses supplied to it. Negative pulses are supplied to an input terminal 1302. AND-gates 1303 and 1304 and flip-flops 1305 and 1306 are provided. The input terminal 1301 is connected to the set input terminal of the flip-flop 1305 and the input terminal 1302 is connected to set input terminal of the flip-flop 1306. The output terminal of the AND-gate 1303 is connected to the reset input terminal of flip-flop 1305 and the output terminal of the AND-gate 1304 is connected to the reset input terminal of the flip-flop 1306.

In FIG. 13 an OR-gate 1307 has two input terminals connected to the set output terminals of the flip-flops 1305 and 1306. Feedback signals FB are supplied to a feedback pulse terminal 1308. An AND-gate 1309 has two input terminals connected to the output terminal of the OR-gate 1307 and a feedback terminal. An inverter 1310 has an input terminal connected to the output terminal of the AND-gate 1309. AND-gates 1311 and 1312 are provided. One of the input terminals of the AND-gate 1311 is connected to the set output terminal of the flip-flop 1305, and another input terminal is connected to the output of the inverter 1310.

One of the input terminals of the AND-gate 1312 is connected to the set output terminal of the flip-flop 1306 and another input terminal is connected to the output terminal of the inverter 1310. Additionally, output terminals 1313 and 1314 of the AND-gates 1311 and 1312, respectively, serve as the output terminals of the mixer. A clock pulse terminal 1315 has clock pulses of a predetermined frequency supplied to it. The clock pulse frequency is set to be far greater than that of a command pulse. The command pulse duration equals one cycle of the clock pulse.

It is assumed that no feedback signal FB is present in FIG. 13. The output of the AND-gate 1309 becomes 0. Consequently, the output of inverter 1310 becomes 1 and the AND-gates 1311 and 1312 are left in their conductive condition. If a command pulse is applied to the input terminal 1301 in this situation, for example, the flip-flop 1305 is set upon the supply of a clock pulse. Consequently, a 1 signal is provided at the output terminal 1313 via the AND-gate 1311. The flip-flop 1305 is reset, since the output of the AND-gate 1303 is 1 when the pulse applied to the terminal 1301 disappears. The signal which was supplied to the terminal 1313 also disappears. Thus, a single pulse is transferred to a terminal 1313.

When a command pulse is supplied to the input terminal 1301 and the flip-flop 1305 is set, the output of the OR-gate 1307 is 1. Therefore, if a feedback signal FB is then provided, the output of the AND-gate 1309 becomes 1. The output of the inverter 1310 then becomes 0 and there is no signal transferred to the gate 1311 and the output terminal 1313. Furthermore, since the AND-gate 1303 is in its nonconductive condition, resetting of the flip-flop 1305 is prevented. If the feedback signal FB disappears, the AND-gate 1311 is switched to its conductive condition and a pulse is transferred to the terminal 1313, as hereinbefore described. The operation is similar, when a command pulse is supplied to the input terminal 1302.

FIG. 14 illustrates the sign or polarity discriminator 805 or 1206 described in FIGS. 8 and 12. Input terminals 1401 and 1402 of FIG. 14 are connected to output terminals 1313 and 1314, respectively, of FIG. 13. FIG. 14 includes AND-gates 1403 and 1404, inverters 1405 and 1406, a flip-flop 1407, AND-gates 1408 and 1409, OR-gates 1410 and 1411, AND-gates 1412 and 1413, an OR-gates 1414, AND-gates 1415 and 1416, an OR-gates 1417, a clock pulse terminal 1418, output lines 1419 and 1420 for sign or polarity discrimination, a positive output terminal 1421, a negative output terminal 1422, and a terminal 1423 for receiving the signal when the register content is zero.

In FIG. 14, the input terminal 1401 is connected to one of the input terminals of the AND-gate 1403, and the input terminal 1402 is connected to one of the input terminals of the AND-gate 1404. The terminal 1423 is connected to the remaining input terminals of the AND-gates 1403 and 1404. The output terminal of the AND-gate 1403 is connected to the input terminal of the flip-flop 1407 and the output terminal of the AND-gate 1404 is connected to the reset input terminal of the flip-flop 1407. The output terminal of the AND-gate 1403 is connected to an input terminal of the inverter 1405 and the OR-gate 1410.

The output terminal of the AND-gate 1404 is connected to an input terminal of the inverter 1406 and the OR-gate 1411. One of the input terminals of the AND-gate 1409 is connected to the set output terminal of the flip-flop 1407. The other input terminal of the flip-flop 1407 is connected to the output terminal of the inverter 1406. One of the input terminals of the AND-gate 1408 is connected to the reset output terminal of the flip-flop 1407 and the other input terminal of said AND gate is connected to the output terminal of the inverter 1406. The output terminal of the AND-gate 1409 is connected to one of the terminals of the OR-gate OR-gate 1410 and the output terminals of the OR-gate 1411.

The input terminal 1401 is connected to an input terminal of each of the AND-gates 1412 and 1415. The input terminal 1402 is connected to an input terminal of each of the AND-gates 1413 and 1416. The output terminal of the OR-gate 1410 is connected to a terminal of each of the AND-gates 1412 and 1416. The output terminal of the OR-gate 1411 is connected to an input terminal of each of the AND-gates 1413 and 1415. The output terminals of the AND-gates 1412 and 1413 are respectively connected to the two input terminals of the OR-gate 1414. The output terminals of the AND-gates 1415 and 1416 are respectively connected to the two input terminals of the OR-gate 1417.

The output terminals of the OR-gates 1414 and 1417 are connected to the output terminals 1421 and 1422, respectively, of the sign discriminator of FIG. 14. The terminal 1421 is connected to the addition input terminal of the register (not shown in FIG. 14) and the terminal 1422 is connected to the subtraction input terminal of said register.

If the content of the register 1213 of FIG. 12 is zero, a logic 1 signal is provided at the terminal 1423 OF FIG. 14 OR-gate switches the AND-gates 1403 and 1404 to their conductive condition. Therefore, when a pulse is supplied to the positive input terminal 1401, it is transferred to the output terminal 1421 via the AND-gate 1403, the OR-gate 1410, the AND-gate 1412, and the AND-gate 1414, in that order. Since the flip-flop 1407 is set by the output OR-gate the AND-gate 1403, the signal is provided at the output terminal of the AND-gate 1409. Consequently, the signal is transferred to the terminal 1419 for positive direction instruction via the OR-gate 1410.

Thus, when input pulses are successively supplied to the input terminal 1401, they are transferred to the terminal 1421 through the AND-gate 1412 and the OR-gate 1414. If the register content is not greater than zero at that time, the signal at the terminal 1423 disappears and the AND-gates 1403 and 1404 are switched to their nonconductive condition. When the register content is not zero, a pulse from the input terminal 1402 is supplied to the terminal 1422 via the AND-gate 1416 and the OR-gate 1417, because the flip-flop 1407 is set. When several input pulses are successively supplied to the input terminal 1402, they are transferred to the subtraction input terminal of the register through the negative output terminal 1422. Consequently, the register content is decreased by those pulses, as well as by the feedback signals, until it becomes zero.

A signal is then provided at the terminal 1423, and the AND-gates 1403 and 1404 are switched to their conductive condition. If more input pulses are supplied to the input terminal 1402 thereafter, a signal is provided at the output terminal of the AND-gate 1404 and switches the AND-gate 1409 to its nonconductive condition through the inverter 1406. The output of AND-gate 1404 switches the other AND-gates 1413 and 1415 to their conductive condition through the OR-gate 1411. Thus, the pulses supplied to the terminal 1402 are supplied to the output terminal 1421 via the AND-gate 1413 and the OR-gate 1414. During this procedure, the AND-gate 1404 resets the flip-flop to switch the AND-gate 1408 to its conductive condition. A signal for negative direction instruction is then provided at the terminal 1420 via the OR-gate 1411. Thereafter the pulses supplied to the input terminal 1402 are transferred to the terminal 1421 through the AND-gate 1418 and the OR-gate 1414.

As thus far described, when a input pulse is supplied to the terminal 1401 when the register content is zero, the sign discriminator provides a signal at the terminal 1419 and simultaneously transfers the pulse to the output terminal 1421. If an input pulse is supplied to the terminal 1402 when the register content is zero, however, the sign discriminator provides a signal at the terminal 1420 and transfers the pulse to the output terminal 1422.

If input pulses are supplied to the input terminal 1401 when the register content is not zero and said pulses are interrupted and an input pulse is supplied to the terminal 1402, the signal at the terminal 1419 disappears and a new signal is provided at the terminal 1420. The input pulses successively fed to the terminal 1402 are supplied to the register as the subtraction input until the register content is reduced to zero. Conversely, when the pulses supplied to the terminal 1402 are interrupted and input pulses start being supplied to the terminal 1401 before the register content is reduced to zero, the pulses are transferred to the register as the subtraction input. If input pulses continue to be supplied to the terminal 1401 after the register content became zero, the signal at the terminal 1420 disappears and a signal is provided at the terminal 1419. The subsequently supplied input pulses are then supplied to the register as the addition input.

The logic condition of the ZERO signal provided at the terminal 1423 and the line 1225 of FIG. 12 is $$\mathrm{ZERO} = (\overline{IR}) = \overline{IR2^0 + IR2^1 + \ldots + IR2^{n-1} + IR2^n}$$

Figure 15:
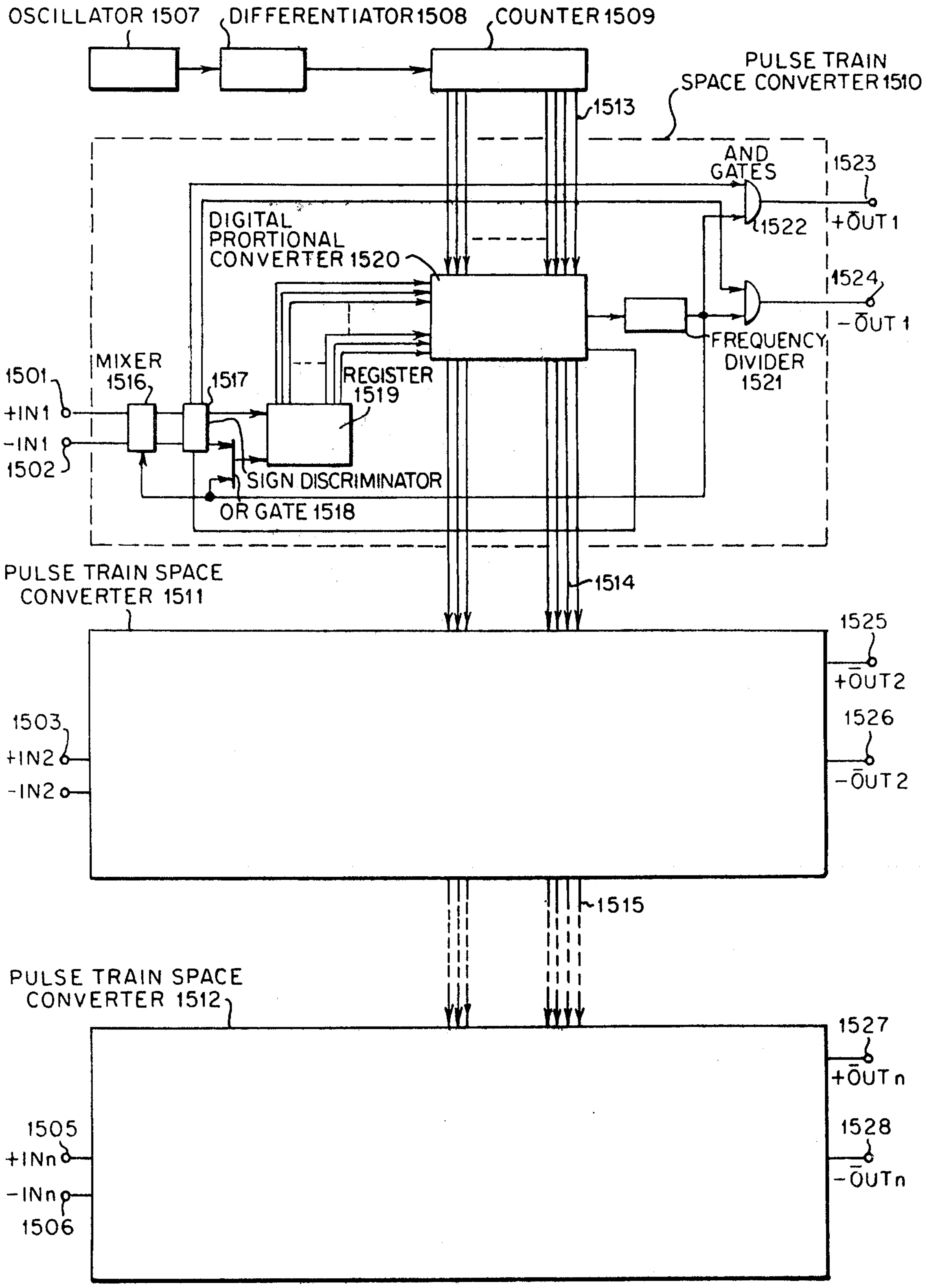
FIG. 15 is a block diagram of another embodiment of the space converter circuit arrangement of the present invention.

Still another embodiment of the pulse train space converter of the present invention is illustrated in FIG. 15. The converter in FIG. 15 is essentially the same as those illustrated in FIGS. 8 and 12, but differs in that it is applicable to a system of *n* axes or dimensions, as illustrated in FIG. 2. In FIG. 15, each of a plurality of pulse train space converters 1510, 1511, ... 1512 is the same as that of FIG. 12. The converter 1510 has a positive input terminal 1501 and a negative input terminal 1502, a positive output terminal 1523 and a negative output terminal 1524.

In FIG. 15, output lines 1513 of a counter 1509 of the first converter 1510 are connected to lines 1514 and 1515. Each of the converters commonly utilizes the counter 1509, a differentiator 1508 and a variable frequency oscillator 1507. Each of the converters includes a mixer 1516, a sign discriminator 1517, an OR-gate 1518, a register 1519, a digital proportional converter 1520, a frequency divider 1521, and an AND-gate 1522.

The pulse train space converter 1511 has a pair of input terminals 1503 and 1504, and a pair of output terminals 1525 and 1526. The pair of input terminals of the pulse train space converter 1512 has a pair of input terminals 1505 and 1506 and a pair of output terminals 1527 and 1528.

Figure 16:
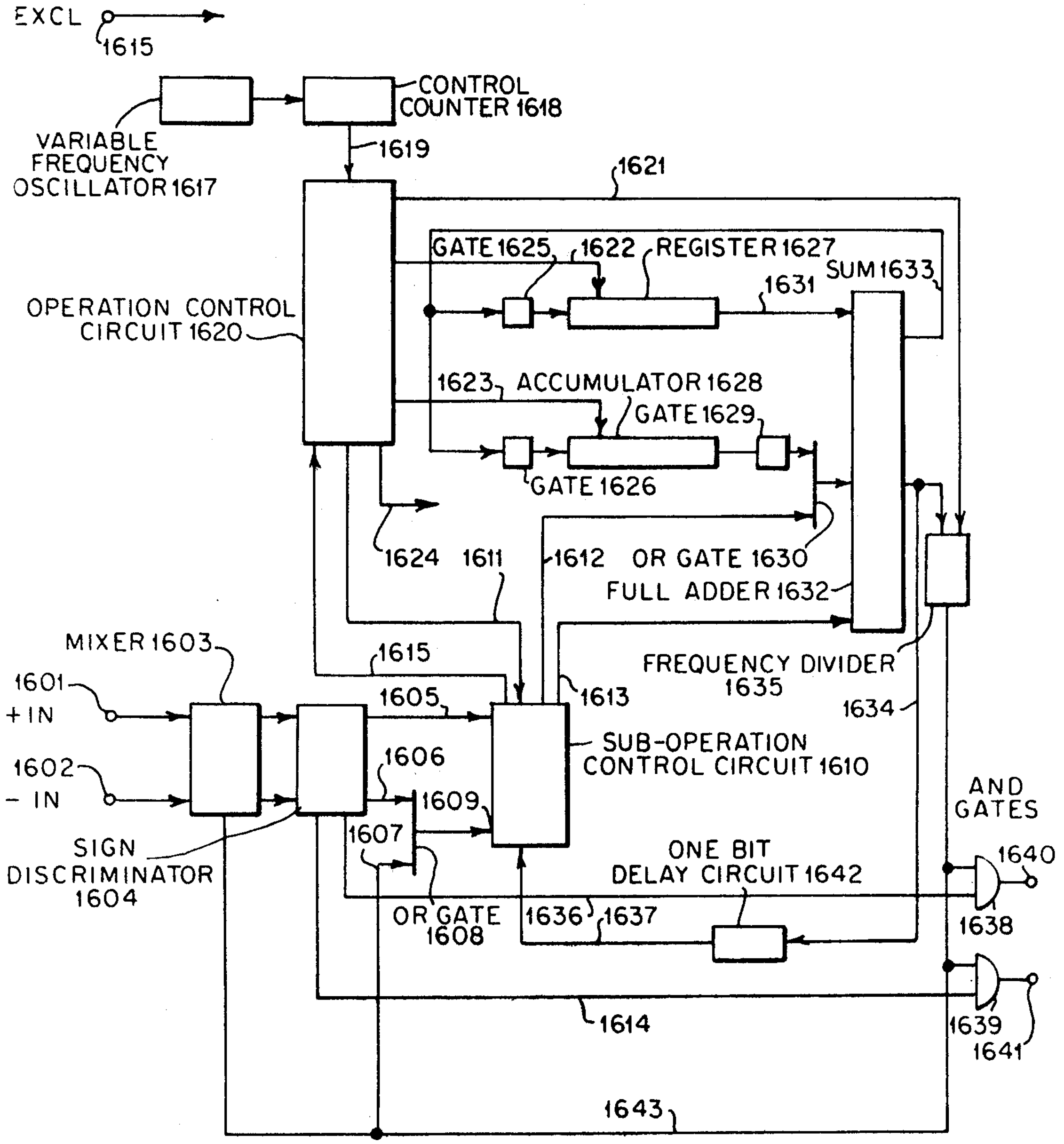
FIG. 16 is a block diagram of still another embodiment of the space converter circuit arrangement of the present invention.

FIG. 16 illustrates still another embodiment of the converter of the present invention. The converter of FIG. 16 utilizes the principle of the digital differential analyzer or DDA, which is known as a numerically controlled pulse distributor.

In FIG. 16, positive input pulses are supplied to the input terminal 1601 of the converter. Negative command pulses are supplied to the input terminal 1602. A mixer 1603 and a sign discriminator 1604 are provided. The discriminator 1604 has output terminals 1605 and 1606. An OR-gate 1608 has an output terminal 1609. These components are similar to the corresponding ones of previously described embodiments.

In FIG. 16, a suboperation control circuit 1610 processes input pulses, feedback signals, and carries, and comprises a complement device, $a$+1 circuit and a gate circuit. Pulses of 500 kilohertz to 4,000 kilohertz are supplied to an external clock terminal 1616. A variable frequency oscillator 1617 and a control counter 1618 having an output terminal 1619 are provided. A main operation control circuit hereinafter described address designation in the register, read/write instructions, gate control, control of the suboperation control circuit 1610, detection instruction of overflow pulse, etc.

Gates 1625, 1626 and 1629, and a register 1627, comprising a core memory are provided. When an address designation is issued to the output line 1622 of the operation control circuit 1620, memory information (binary number) is provided as a series output successively by one digit to the output line 1631 in series, starting from the lowest digital order. New information is written in the register 1627 by the following procedure. The gate 1625 is switched to its conductive condition. A series of binary numbers are transferred to the register 1627 via the gate 1625. An address designation is simultaneously supplied to the bus 1622 at the feeding of each binary number.

The embodiment of FIG. 16 performs two-stage processing, involving input information processing and arithmetic processing. First, a command pulse is supplied to the input terminal 1601 or 1602. If, for example, an input pulse is supplied to the line 1605, the suboperation control circuit 1610 issues an addition-subtraction instruction to the main operation control circuit 1620 via the line 1615.

At the operation control circuit 1620, while it is forming an input information processing routine, a signal is sent to the suboperation control circuit 1610 via the line 1611. The control circuit 1610 then provides $a$+1 signal in the line 1613. The main operation control circuit 1620 provides a gate control signal in the output line 1624, to switch the gate 1625 to its conductive condition, and provides an address designation in the bus 1622. Thus, the value of the lowest digital order in the register 1627 is first supplied to the full adder 1632 via the line 1631.

The operation result when the +1 signal is transferred to the line 1613 is again written in the same location in the register 1627 via the line 1633 and the gate 1625. In FIG. 16, an accumulator 1628 comprises a core memory, similar to the aforementioned register 1627. Information is written in the accumulator 1628 by the following procedures. The gate 1626 is switched to its conductive condition. Binary serial numerals are supplied to the accumulator 1628 via the gate 1626. An address designation is simultaneously transferred from the control circuit 1620 to the bus 1623 at each supply of a binary number.

The information in the accumulator is read by maintaining the gate 1629 in its conductive condition and transferring an address designation to the bus 1623 from the control circuit 1620. An OR-gate 1630 and a full adder 1632 are provided in FIG. 16. The register 1627 has an output line 1631, the OR-gate 1630 has an output line, and the suboperation control circuit 1610 has an output line 1613, all of which function as input lines to the full adder 1632. The adder 1632 also has an output line 1633 for discharging the sum resulting from the operation, and another line 1634 to which the carry is to be discharged. The output line 1633 is connected to the input line of the register 1627 via the gate 1625 and is connected to the input line of the accumulator 1628 via the gate 1626.

The overflow pulse detection instruction is sent from the control circuit 1620 to the output line 1621. The frequency divider 1635 counts the overflow pulse when the carry pulse or overflow pulse to the highest digital order is found as the result of the operation. The output pulse of the frequency divider 1635 is derived at either the positive or negative output terminals of the pulse train space converter through either the gate 1638 or 1639. Again, the output pulse of the frequency divider 1635 is provided at the feedback pulse terminal 1607 and is supplied to the mixer 1603 via the line 1643. A one-bit delay circuit 1642 functions to delay, by one bit, the carry provided at the output line 1634 of the full adder 1632 and supplies it again to the full adder 1632.

The register 1627 of the pulse train space converter of FIG. 16 has an initial value of zero. The command pulses are to be accumulated in the register 1627. An accumulator 1628 has an initial value of zero. The content of the register 1627 is repetitively added to the accumulator 1628 in a fixed cycle. Therefore, under the assumption that the accumulated value in the register is not zero, the frequency of carry pulse to the highest digital order or overflow pulse in the accumulator 1628, occurring when the periodical addition of the content of the register 1627 to said accumulator is continued, is directly proportional to the content of said register, since the number of digits in said accumulator is definite or limited.

The carrying of thus-formed overflow pulse is conducted when such is instructed by the detection command issued to line 1621 from the control circuit 1620. In the foregoing explanation, the content or accumulated value in the register 1627 is assumed to be constant, but such value is either increased or decreased by one upon the supply of each command pulse at the input terminal 1601 or 1602. Also, upon the supply of each feedback signal at the feedback terminal 1607, the accumulated value in the register 1627 must be reduced by one.

If there is a carry as a result of the operation, the carry is again supplied to the full adder 1632 via the line 1634, the one-bit delay circuit 1642, the operation control circuit 1610, and the line 1613, in that order. Thus, an operation for adding one to the content of the register 1627 is completed. When an input pulse or a feedback signal is provided in the line 1609, the operation control circuit supplies a complement of one to the line 1612 and +1 to the line 1613. Thus, similarly to the aforedescribed procedure, addition is effected sequentially in series, from the lowest order digit in the content of the register 1627.

When the operation from the lowest to the highest order digit in the register 1627 is completed, the control circuit starts arithmetic processing. In this operation, the content of the register 1627 is added to the content of the accumulator 1628. That is, a signal is transmitted from the operation circuit 1620 to the bus 1624, to switch the gates 1626 and 1629 to their conductive condition, so that they transfer address designations to the buses 1622 and 1623, respectively. The contents of the register 1627 and the accumulator 1628 are thereby transferred to the full adder 1632 from each lowest order digit. The contents of the register 1627 and the accumulator 1628 are added, one bit by one bit, and each sum is written in the identical location in the accumulator 1628 via the line 1633 and the gate 1626.

If there is a carry, it is supplied to the full adder 1632 via the line 1634, the one bit delay circuit 1642, the suboperation control circuit 1610 and the line 1613. In the operation, the recorded content of the register 1627 is read out, but not erased. When an overflow pulse is produced in the accumulator 1628 as the result of arithmetic operation, the overflow pulse is detected by the coincidence thereof with the detection signal appearing at the line 1621, as hereinbefore mentioned, and supplied to the frequency divider 1635. The output pulse of the frequency divider 1635 appears at the line 1636 or 1637, and is subsequently transferred to the output side either through the gate 1638 or 1639, according to the positive or negative command signal.

Figure 17:
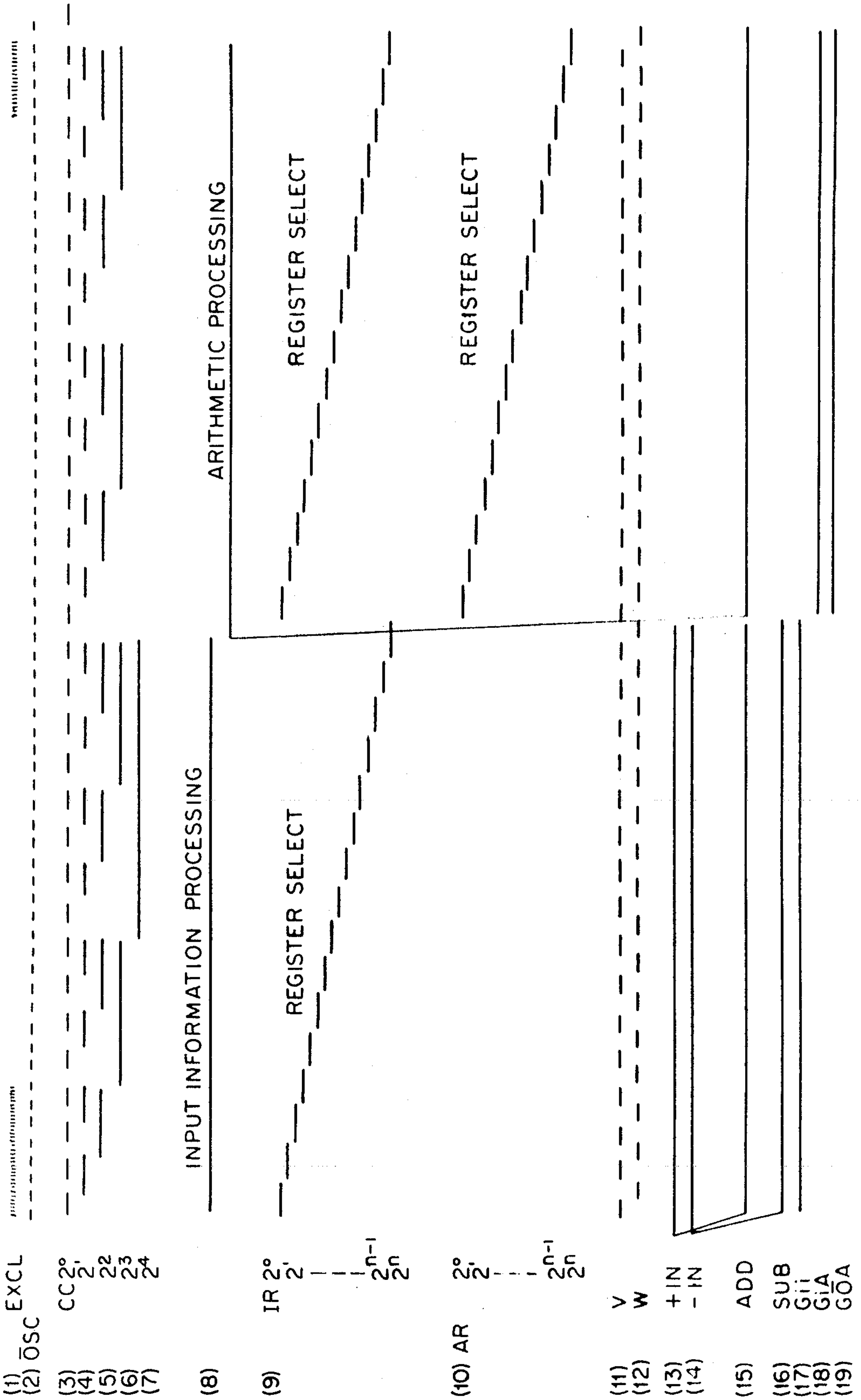
FIG. 17 is a time chart for explaining the operation of the embodiment of FIG. 16.

FIG. 17 is a time control chart of the embodiment of FIG. 16. In FIG. 17, (1) is an externally supplied clock pulse. The output pulse of the variable frequency oscillator, which is synchronized by the externally supplied clock pulse is indicated as (2) in FIG. 17. In FIG. 17, diagrams (3) through (8) are the signals appearing at the output bus 1619 of the control counter 1618. The diagram (3) is the signal obtained from the lowest order digit $CC2^0$ of the counter 1618, the diagram (4) is the signal obtained from the second digit $CC2^1$, and the remaining diagrams are the signals similarly obtained from the third, fourth and fifth digits, respectively.

As indicated by the diagram (8), one operation cycle of the pulse train space converter is divided into two parts, input information processing and arithmetic processing. The diagram (9) indicates the selection status of each digit in the register 1627. At the rise time of the repetition signal indicated in the diagram (3), each digit in the register 1627 is selected to the successively higher order, from the lower order. The diagram (10) of FIG. 17 illustrates the selection status of each digit in the accumulator 1628.

The selection of the content of the register 1627 is conducted in both the information processing operation and the arithmetic processing operation. In the accumulator 1628, however, the successive selection from the lower order is conducted in an arithmetic processing operation only. The diagram (11) of FIG. 17 is the read signal and the diagram (12) is the write signal. For example, when the lowest order digit $IR2^0$ to $IR2^n$ in the register is selected in an input information processing operation, reading is effected during the first half of the time assigned, and the result is written during the latter half. This description also applies to operation of the accumulator in an arithmetic processing operation.

The diagram (13) of FIG. 17 indicates that when a designation pulse is provided at the positive side, addition is effected, as illustrated in the diagram (15). The diagram (14) indicates that when a command pulse is provided at the negative side, subtraction is effected. Addition is also effected in an arithmetic processing operation. The signal of the diagram (17) is the signal which switches the gate 1625 to its conductive condition. The gate 1625 transfers a signal to the register 1627 of FIG. 16. The signal of the diagram (18) is the signal which switches the gate 1626 to its conductive condition. The gate 1626 transfers a signal to the accumulator 1628 of FIG.

16. The signal of the diagram (19) is the signal which switches the gate 1629 of FIG. 16 to its conductive condition.

In the last-mentioned embodiment, there is no need for counter circuit comprising flip-flops, and so on, and all required operations may be achieved by the register and the full adder. The circuit configuration may thus be simplified, with greater facility in multiaxial control by time division. As thus far disclosed, a digital to analog converter and a variable frequency oscillator are omitted in the pulse train space converter of the invention. However, a pulse train having a repetition rate directly proportional to the accumulated value in the register is formed by arithmetic processing of the digital numerical value and the proportional relationship between the accumulated value in the register, and the frequency of the output pulse from the pulse train space converter is advantageously maintained with high precision.

While the invention has been described by means of specific examples and in specific embodiments, we do not wish to be limited thereto, for obvious modifications will occur to those skilled in the art without departing from the spirit and scope of the invention.

We claim:

1. A pulse train space converter for making the spaces in an input pulse train more nearly uniform, said converter comprising input means for providing an input command pulse train;

memory means connected to said input means for accumulating command pulses as digital values;

a digital to pulse frequency converter for digitally converting the accumulated value in said memory means to an output pulse train having a frequency directly proportional to the accumulated value in said memory means; negative feedback connected between said frequency converter and said memory means for transferring output pulses of said frequency converter to said memory means as negative feedback pulses; and output means connected to said frequency converter for providing said output pulse train.

2. A pulse train space converter as claimed in claim 1, wherein said memory means comprises a reversible counter.

3. A pulse train space converter as claimed in claim 1, further comprising a timing pulse oscillator having an output and a frequency divider having an input connected to said oscillator and an output connected to said memory means and said frequency converter.

4. A pulse train space converter for making the spaces in an input pulse train more nearly uniform, said converter comprising input means for providing an input command pulse train having positive and negative pulses;

memory means connected to said input means for accumulating command pulses as digital values;

a digital to pulse frequency converter for digitally converting the accumulated value in said memory means to an output pulse train having a frequency directly proportional to the accumulated value in said memory means; negative feedback connected between said frequency converter and said memory means for transferring output pulses of said frequency converter to said memory means as negative feedback pulses;

sign discriminator means connected between the input means and the memory means for determining whether each output pulse of the frequency converter is transferred to the corresponding output terminal; and output means connected to said frequency converter for providing said output pulse train, said output means comprising a positive polarity output terminal and a negative polarity output terminal.

5. A pulse train space converter as claimed in claim 17, mixer means connected between said input means and said sign discriminator means for preventing overlap of the fed back output and the command pulses.

6. A pulse train space converter for making the spaces in an input pulse train more nearly uniform, said converter comprising input means for providing an input command pulse train;

clock means for providing a clock pulse train;

digital to pulse frequency converting means having inputs coupled to said input means and said clock means and an output for accumulating command pulses as digital values and converting command pulses accumulated in said frequency converting means to a pulse train having a frequency directly proportional to the accumulated value, the output of said frequency converting means being connected in negative feedback arrangement to an input thereof thereby feeding back the output of said frequency converting means negatively and in a digital manner and providing an output pulse train free of abrupt frequency change;

output means connected to the output of said frequency converting means for providing said output pulse train; and mixer means connected between said input means and said frequency converting means for preventing overlap of the fed back output and the command pulses.

7. A pulse train space converter for making the space in an input pulse train more nearly uniform, said converter comprising input means for providing an input command pulse train;

clock means for providing a clock pulse train;

digital to pulse frequency converting means having inputs coupled to said input means and said clock means and an output for accumulating command pulses as digital values and converting command pulses accumulated in said frequency converting means to a pulse train having a frequency directly proportional to the accumulated value, the output of said frequency converting means being connected in negative feedback arrangement to an input thereof thereby feeding back the output of said frequency converting means negatively and in a digital manner and providing an output pulse train free of abrupt frequency change;

output means connected to the output of said frequency converting means for providing said output pulse train;

and mixer means connected between said input means and said frequency converting means for preventing overlap of the fed back output and the command pulses, said frequency converting means comprising memory means having a plurality of outputs and an input connected to said mixer means for accumulating command pulses as digital values, counter means coupled to said clock means and having a plurality of outputs for counting pulses, and a digital proportional converter having an output, a first group of inputs connected to the outputs of the counter means and a second group of inputs connected to the outputs of the memory means.

8. A pulse train space converter as claimed in claim 7, further comprising oscillator means and differentiator means connected between said oscillator and clock means and the counter means of said frequency converting means for precisely synchronizing the clock pulses provided by said clock means.

9. A pulse train space converter as claimed in claim 7, further comprising a frequency divider connected between said clock means and the output of the digital proportional converter of said frequency converting means and said output means for correcting disturbances in the intervals of the output pulses of said frequency converting means.

10. A pulse train space converter for making the spaces in an input pulse train more nearly uniform, said converter comprising input means for providing an input command pulse train comprising positive and negative pulses;

digital to pulse frequency converting means having inputs coupled to said input means and an output for accumulating command pulses as digital values and converting command pulses accumulated in said frequency converting means to a pulse train having a frequency directly proportional to the accumulated value, the output of said frequency converting means being connected in negative feedback arrangement to an input thereof thereby feeding back the output of said frequency converting means negatively and in a digital manner and providing an output pulse train free of abrupt frequency change;

output means connected to the output of said frequency converting means for providing said output pulse train, said output means comprising a positive polarity output terminal and a negative polarity output terminal;

sign discriminator means connected between said input means and said frequency converting means for determining whether each output pulse of said frequency converting means is transferred to the corresponding output terminal; and mixer means connected between said input means and said sign discriminator means for preventing overlap of the fed back output and the command pulses.

11. A pulse train space converter as claimed in claim 10, wherein said frequency converting means comprises memory means having a plurality of outputs and inputs connected to said sign discriminator means for accumulating command pulses as digital values, counter means having a plurality of outputs for counting pulses, and a digital proportional converter having an output, a first group of inputs connected to the outputs of said counter means and a second group of inputs connected to the outputs of said memory means.

12. A pulse train space converter as claimed in claim 11, further comprising oscillator means and differentiator means connected between said oscillator means and the counter means of said frequency converting means.

13. A pulse train space converter as claimed in claim 11, further comprising a frequency divider connected between the output of the digital proportional converter of said frequency converting means and said output means for correcting disturbances in the intervals of the output pulses of said frequency converting means.

14. A pulse train space converter for making the spaces in an input pulse train more nearly uniform, said converter comprising input means for providing an input command pulse train comprising positive and negative pulses;

suboperation control means having inputs coupled to said input means and outputs;

full adder means having inputs connected to the outputs of said suboperation control means and an output;

output means connected to the output of said full adder means for providing an output pulse train, said output means having a positive polarity output terminal and a negative polarity output terminal;

sign discriminator means connected between said input means and said suboperation control means for determining whether each output pulse is transferred to the corresponding output terminal;

negative feedback means between said output means and an input of said suboperation control means for feeding back the output of said output means negatively and in a digital manner and providing an output pulse train free of abrupt frequency change; and mixer means connected between said input means and said sign discriminator means for preventing overlap of the fed back output and the command pulses.

15. A pulse train space converter as claimed in claim 14, further comprising operation control means connected to inputs of said full adder means and a frequency divider connected between the output of said full adder means and said output means for correcting disturbances in the intervals of said output pulses.

16. A pulse train space converter as claimed in claim 15, wherein said operation control means comprises operation control circuit means having inputs and outputs, one of said inputs and one of said outputs being connected to said suboperation control means, oscillator means, differentiator means connected between said oscillator means and an input of said operation control circuit means, register means connected between an output of said operation control circuit means and an input of said full adder means, and accumulator means connected between an output of said operation control circuit means and an input of said full adder means.

* * * * *